(12) United States Patent
Phillips

(10) Patent No.: US 11,608,251 B1
(45) Date of Patent: Mar. 21, 2023

(54) PNEUMATICALLY ADJUSTABLE LIFTING APPARATUS

(71) Applicant: United States of America as represented by the Administrator of NASA, Washington, DC (US)

(72) Inventor: Rodney N. Phillips, Madison, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 269 days.

(21) Appl. No.: 17/153,456

(22) Filed: Jan. 20, 2021

(51) Int. Cl.
  *B66C 13/00* (2006.01)
  *B66C 13/08* (2006.01)
  *F16F 13/00* (2006.01)
  *B66C 1/34* (2006.01)

(52) U.S. Cl.
  CPC ............... *B66C 13/08* (2013.01); *B66C 1/34* (2013.01); *F16F 13/002* (2013.01); *F16F 2232/08* (2013.01)

(58) Field of Classification Search
  CPC .... B66C 1/24; B66C 1/34; B66C 1/46; B66C 13/08; B66C 13/14; F16F 13/002; F16F 2232/08; F16F 2232/045
  See application file for complete search history.

(56) References Cited

U.S. PATENT DOCUMENTS

| | | | |
|---|---|---|---|
| 2,969,974 A * | 1/1961 | Pemberton | B60G 11/34 267/34 |
| 3,365,075 A | 1/1968 | Van Gils et al. | |
| 4,025,055 A | 5/1977 | Strolenberg | |
| 4,155,538 A | 5/1979 | Claassen | |
| 4,395,178 A | 7/1983 | MacDonell | |
| 4,724,970 A | 2/1988 | Kuhn | |
| 4,930,828 A | 6/1990 | Rerat | |

(Continued)

FOREIGN PATENT DOCUMENTS

| | | | | |
|---|---|---|---|---|
| CN | 204522272 U | * | 8/2015 | |
| DE | 102006050484 A1 | * | 5/2007 | ............. B62K 25/04 |

(Continued)

OTHER PUBLICATIONS

"Hydra Set Precision Load Positioner", Del Mar Avionics (on-line publication available at least as early as Aug. 16, 2020).

*Primary Examiner* — Emmanuel M Marcelo
(74) *Attorney, Agent, or Firm* — Jerry L. Seemann; Trenton J. Roche

(57) ABSTRACT

A pneumatically adjustable lifting apparatus utilizes inflatable spring devices for lifting and precisely positioning a load at a desired location. Variations in the forces produced by the load cause the inflatable spring devices to expand or compress thereby allowing soft mating between components that need to be connected together, such as assembling or disassembling large threaded connections. Pneumatic pressure in the inflatable spring devices may be adjusted depending upon the particular load. The pneumatically adjustable lifting apparatus provides lightly damped vertical travel with a substantially linear force profile over a relatively wide displacement range. Recirculating linear ball bearings cooperate with the linear loading characteristics of the inflatable spring devices to minimize the vertical motion damping of the pneumatically adjustable lifting apparatus.

20 Claims, 21 Drawing Sheets

(56) References Cited

U.S. PATENT DOCUMENTS

| | | | |
|---|---|---|---|
| 4,964,491 A | 10/1990 | Dombrowski et al. | |
| 5,542,806 A * | 8/1996 | Kang | B66F 7/0633 |
| | | | 414/678 |
| 6,068,240 A | 5/2000 | Leveugle | |
| 6,286,812 B1 * | 9/2001 | Cherry | B66F 7/065 |
| | | | 254/9 C |
| 6,929,249 B1 * | 8/2005 | Kim | B66F 3/35 |
| | | | 254/93 H |
| 7,070,167 B1 * | 7/2006 | Bacon | B66F 7/085 |
| | | | 254/93 HP |
| 7,980,610 B2 | 7/2011 | Claraz et al. | |
| 9,675,508 B2 * | 6/2017 | Hall | A47C 7/002 |
| 10,287,136 B2 | 5/2019 | Bergem | |
| 10,584,015 B2 | 3/2020 | Rossin et al. | |
| 10,669,137 B2 | 6/2020 | Trail | |
| 2009/0278098 A1 * | 11/2009 | Bacon | B66F 7/22 |
| | | | 254/1 |

FOREIGN PATENT DOCUMENTS

| | | | | |
|---|---|---|---|---|
| FR | 3099396 A1 * | 2/2021 | | B66C 1/427 |
| GB | 1159361 A * | 7/1969 | | B66C 1/46 |

\* cited by examiner

PNEUMATICALLY ADJUSTABLE LIFTING APPARATUS

ORIGIN OF THE INVENTION

The invention described herein was made by employees of the United States Government and may be manufactured and used by or for the Government of the United States of America for governmental purposes without the payment of any royalties thereon or therefor.

CROSS-REFERENCES TO RELATED PATENT APPLICATIONS

None.

TECHNICAL FIELD

The present invention relates to a pneumatically adjustable lifting apparatus.

BACKGROUND

In order to assemble and disassemble large threaded components together, it is essential to minimize loading on the threaded mating surfaces of the components in order to minimize friction on the threads while screwing the components together thereby avoiding damage to the threaded mating surfaces. It is also desirable to maximize the tactile feel of the rotating component by the technicians who are performing the assembly or disassembly operations so as to allow these technicians to halt operations if they detect any resistance. Some conventional lifting devices offer extremely fine vertical positioning control of a suspended load by means of manipulating a non-compressible hydraulic fluid. However, non-compressible fluids provide a very stiff interface with no compliance and thus, such conventional lifting devices require constant operator manipulation during thread-mating operations. Other conventional lifting devices use pneumatically balanced hydraulic cylinders coupled with the flow of hydraulic fluid in the system to prevent crane overloading during lifting operations. However, such conventional lifting devices exhibit a significant amount of motion damping.

What is needed is an improved lifting apparatus that addresses the problems and deficiencies of conventional lifting systems.

SUMMARY OF THE INVENTION

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of a pneumatically adjustable lifting apparatus are disclosed herein. The pneumatically adjustable lifting apparatus utilizes inflatable spring devices to lift and precisely place a load at a desired location. Pneumatic pressure in the inflatable spring devices may be adjusted depending upon the particular load. Variations in the forces produced by the load cause the inflatable spring devices to expand or compress thereby allowing soft mating between components that need to be connected together, such as assembling or disassembling large threaded connections. The pneumatically adjustable lifting apparatus provides lightly damped vertical travel with a substantially linear force profile over a relatively wide displacement range. Linear recirculating ball bearings cooperate with the linear loading characteristics of the inflatable spring devices to minimize the vertical motion damping. As a result of such operational characteristics, riggers and crane operators can maintain substantially neutral thread-loading with timed incremental movements by the crane while the rigger rotates the mating threaded components. Pneumatic pressure in the inflatable spring devices is adjusted prior to the thread mating operation. Air volume within the inflatable spring devices remains constant throughout operation. The pneumatically adjustable lifting apparatus includes shackles for the attachment of rigging slings and a load attachment assembly. In some embodiments, the load attachment assembly includes a swivel hook assembly having a swivel hook and the load is attached to the swivel hook by cables. Other than the aforementioned rigging slings and cables, there are no other external connections to the pneumatically adjustable lifting apparatus.

In some embodiments, the pneumatically adjustable lifting apparatus has a plurality of vertically oriented linear bearing rods. Each linear bearing rod has a top end and a bottom end. A top plate is movably attached to the linear bearing rods such that the top plate is movable in an upward direction and in a downward direction with respect to the linear bearing rods. The top end of each linear bearing rod is located above the top plate. A bottom plate is spaced apart from the top plate and attached to the bottom end of each linear bearing rod. The bottom plate has a generally centered opening. A plurality of inflatable spring devices are interposed between and attached to the top plate and bottom plate. Each inflatable spring device is inflated with a gas at a predefined pressure. A bearing rod spacer plate is attached to the top end of each linear bearing rod so that the bearing rod spacer plate is positioned above and spaced apart from the top plate. At least one upper hoist assembly is attached to the bearing rod spacer plate and configured to be attached to external lifting machinery. A vertically oriented hollow bearing shaft extends through the generally centered opening in the bottom plate such that the hollow bearing shaft is movable with respect to the bottom plate in an upward direction and in a downward direction. The hollow bearing shaft has an open top end that is positioned above the bottom plate and an open bottom end that is below the bottom plate. A vertically oriented elongate rod extends through the hollow bearing shaft and has a top portion that is secured or attached to the top plate and a bottom portion that extends from the open bottom end of the hollow bearing shaft. A load attachment assembly is attached to the bottom portion of the elongate rod and configured to be attached to a load. When a load is suspended from the load attachment assembly, the weight of the load produces forces that pull the elongate rod downward thereby causing the top plate to move downward and compress the inflatable spring devices and when such forces decrease, the inflatable spring devices expand thereby pushing the top plate upward.

In some embodiments, the pneumatically adjustable lifting apparatus comprises a plurality of vertically oriented linear bearing rods, wherein each linear bearing rod has a top end portion and a bottom end portion. A top plate is movably attached to the linear bearing rods such that the top plate is movable in an upward direction and in a downward direction with respect to the linear bearing rods. The top end portion of each linear bearing rod is above the top plate. An intermediate plate structure is movable attached to the linear bearing rods such that the intermediate plate structure is movable in an upward direction and in a downward direction with respect to the linear bearing rods. The intermediate plate structure is spaced apart from the top plate and has a generally centered opening. A first plurality of inflatable spring devices is interposed between and attached to the top plate and the intermediate plate structure. Each inflatable spring device is inflated with a gas. A bottom plate is attached to the end of each linear bearing rod. The bottom plate is spaced apart from the intermediate plate structure and has a generally centered opening that is aligned with the generally centered opening of the intermediate plate structure. A second plurality of inflatable spring devices is interposed between and attached to the intermediate plate structure and the bottom plate. Each inflatable spring device of the second plurality of inflatable spring devices is inflated with a gas. A pneumatic network is in gaseous communication with and provides pressurized gas to the first plurality of inflatable spring devices and the second plurality of inflatable spring devices. A bearing rod spacer plate is attached to the top end portion of each vertically oriented linear bearing rod such that the bearing rod spacer plate is positioned above and spaced apart from the top plate. At least one upper hoist assembly is attached to the bearing rod spacer plate. The at least one upper hoist assembly is configured to be attached to external lifting machinery. A vertically oriented hollow bearing shaft extends through the generally centered opening of bottom plate and generally centered opening of the intermediate plate structure such that the hollow bearing shaft is movable in an upward direction and in a downward direction with respect to the bottom plate and intermediate plate structure. The hollow bearing shaft has an open bottom end that is below the bottom plate. A vertically oriented elongate rod extends through the hollow bearing shaft and has a top portion secured to the top plate and a bottom portion that extends from the open bottom end of the hollow bearing shaft. A load attachment assembly is attached to the bottom portion of the elongate rod and configured to be attached to a load. When a load is suspended from the load attachment assembly, the weight of the load produces forces that pull the elongate rod downward thereby causing (i) the top plate to move downward and compress the first plurality of inflatable spring devices and (ii) the intermediate plate structure to move downward and compress the second plurality of inflatable spring devices. When the forces associated with the load decrease, the first plurality of inflatable spring devices expand thereby pushing the top plate upward and the second plurality of inflatable spring devices expand thereby pushing the intermediate plate structure upward.

DETAILED DESCRIPTION

Figure 1:
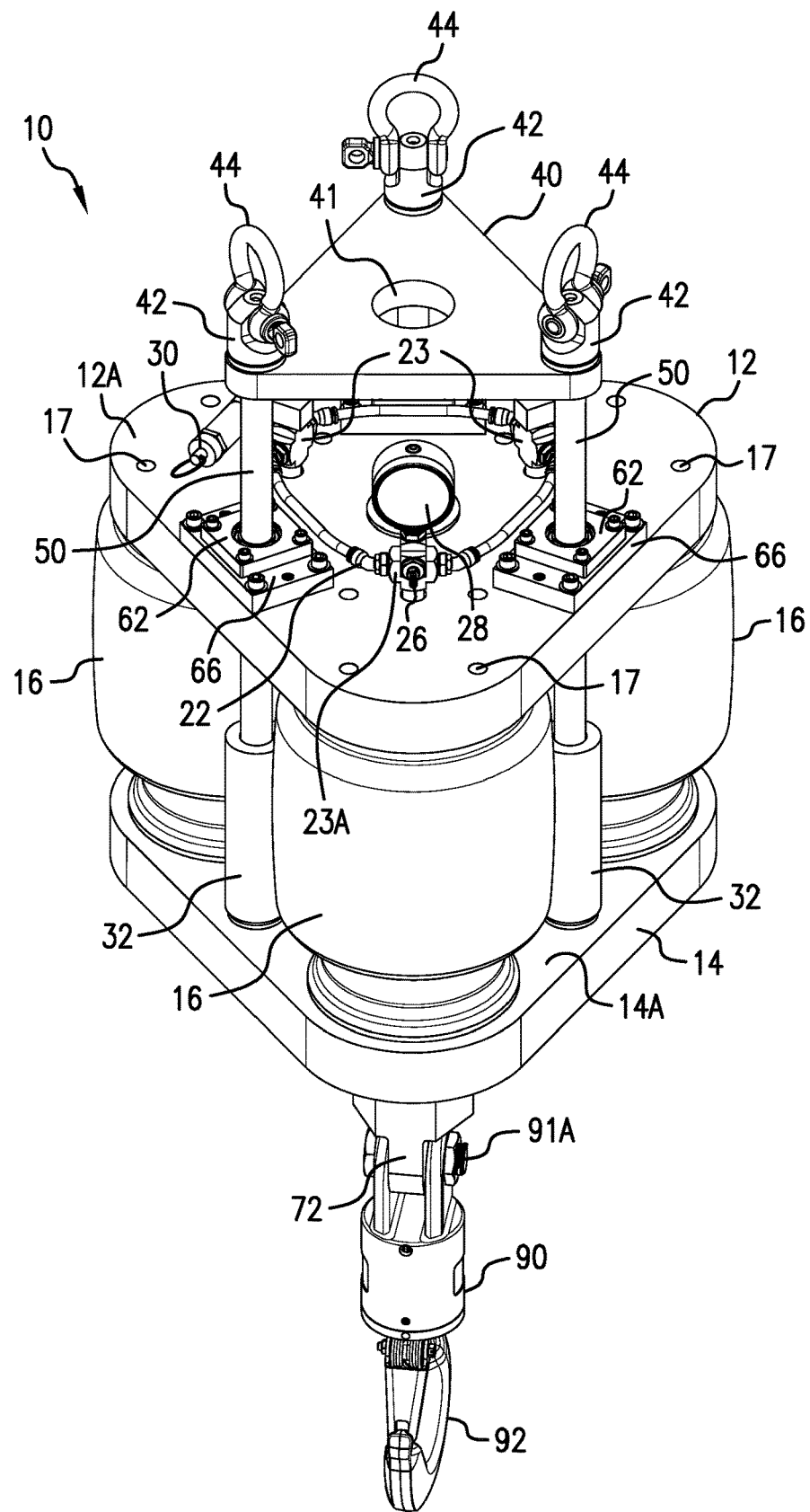
FIG. 1 is a perspective view of an exemplary embodiment of a pneumatically adjustable lifting apparatus.
Figure 2:
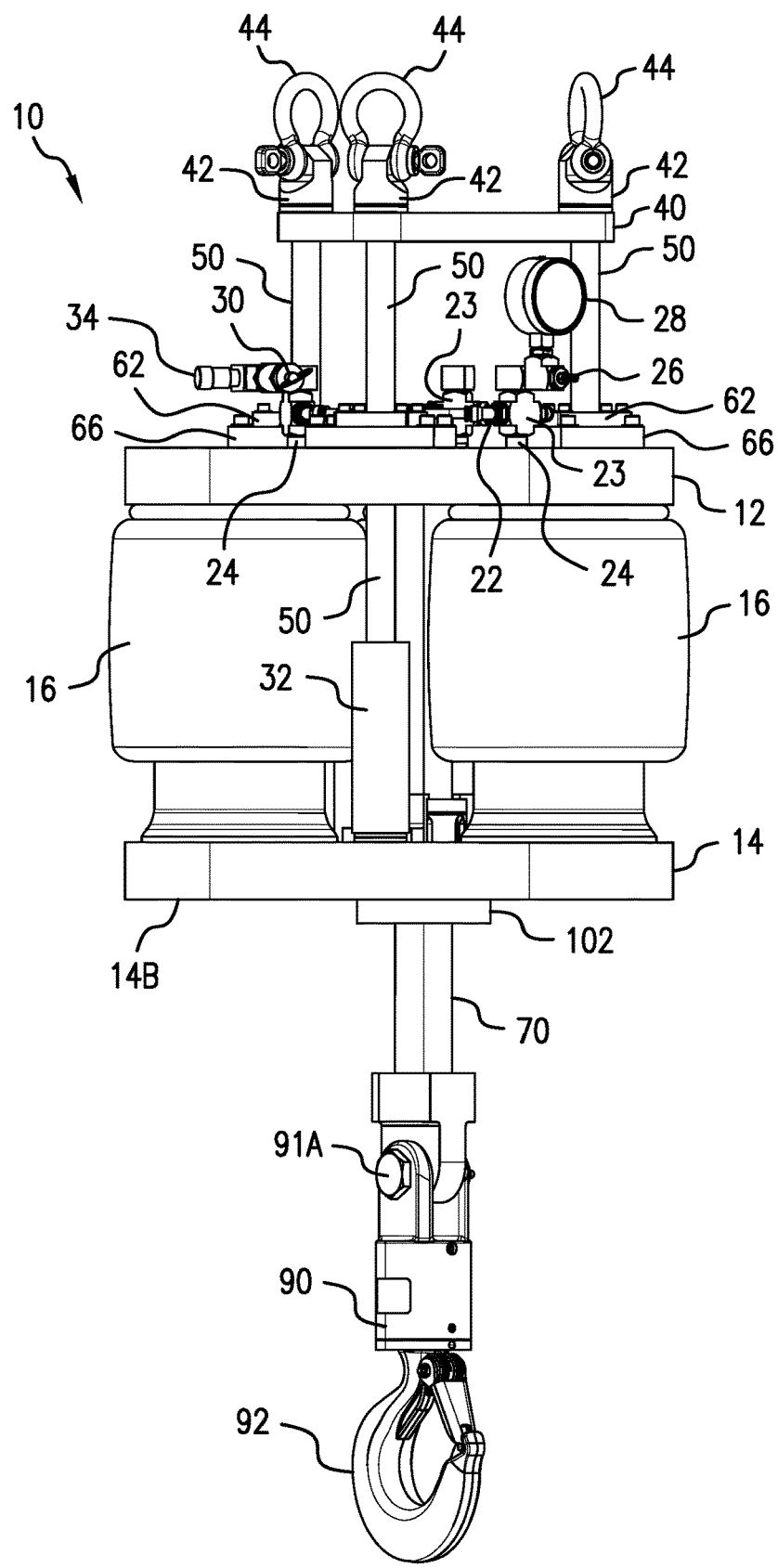
FIG. 2 is a front elevational view of the pneumatically adjustable lifting apparatus.
Figure 3:
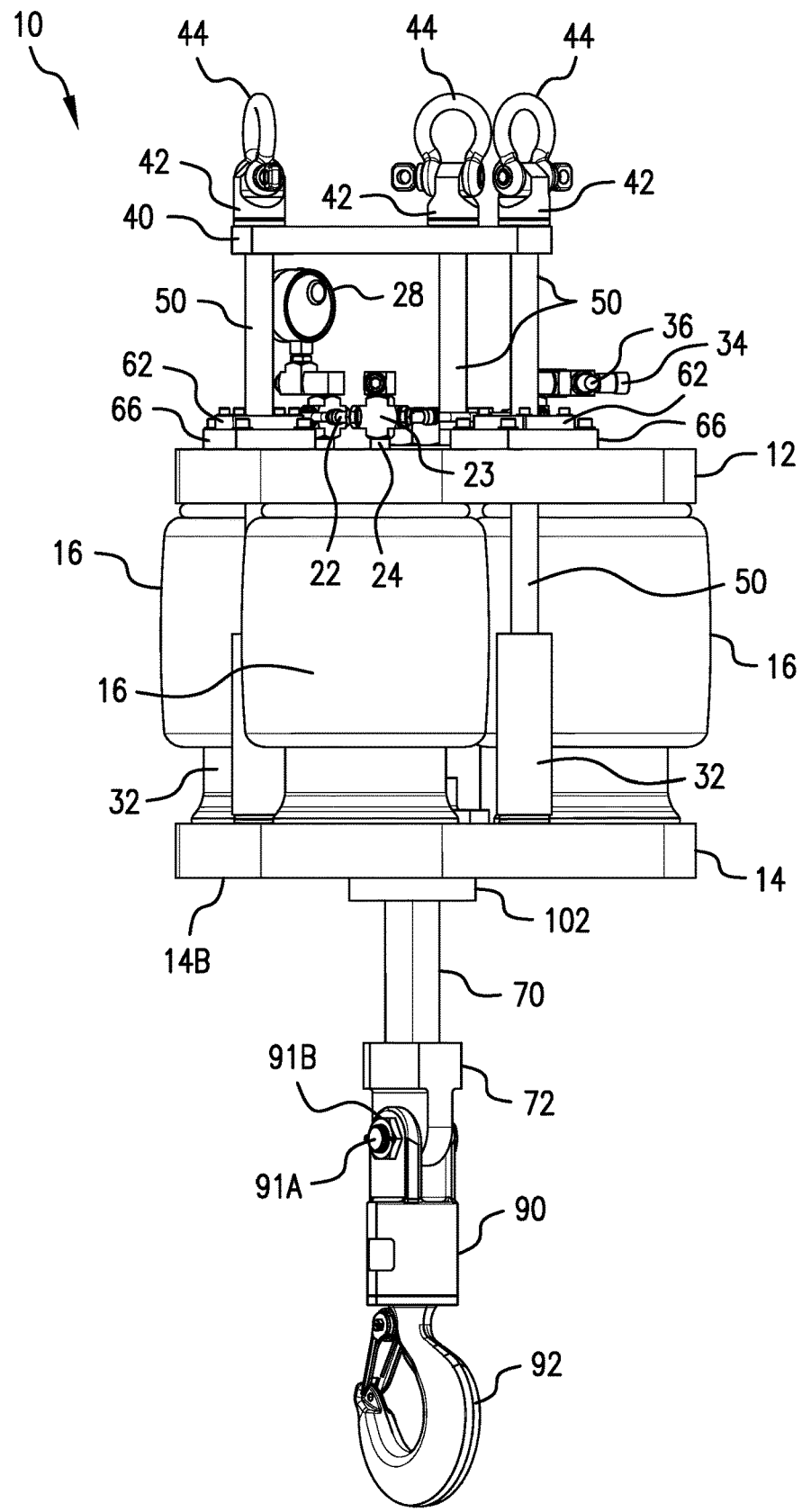
FIG. 3 is a rear elevational view of the pneumatically adjustable lifting apparatus.
Figure 4:
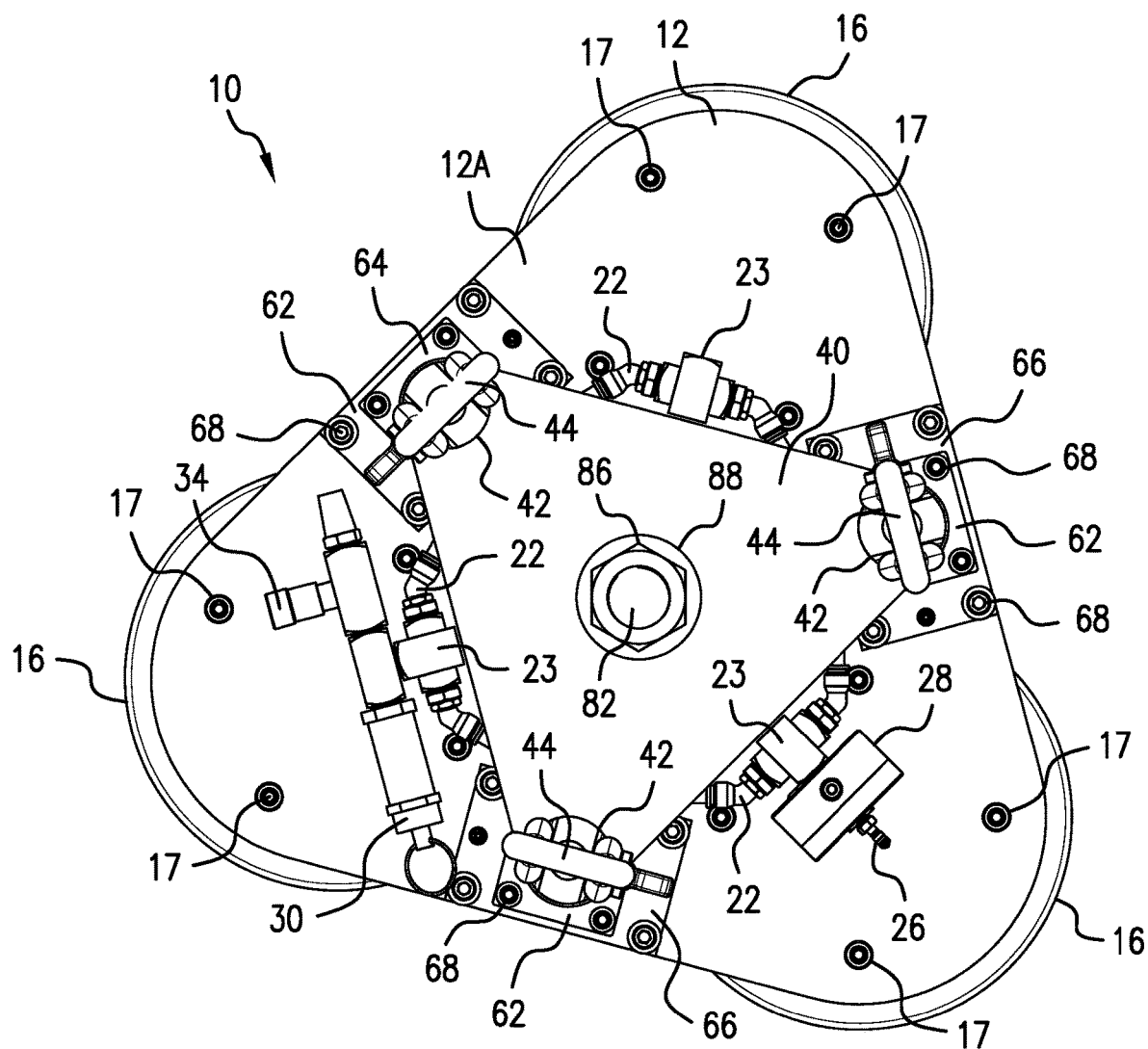
FIG. 4 is a top plan view of the pneumatically adjustable lifting apparatus.
Figure 5:
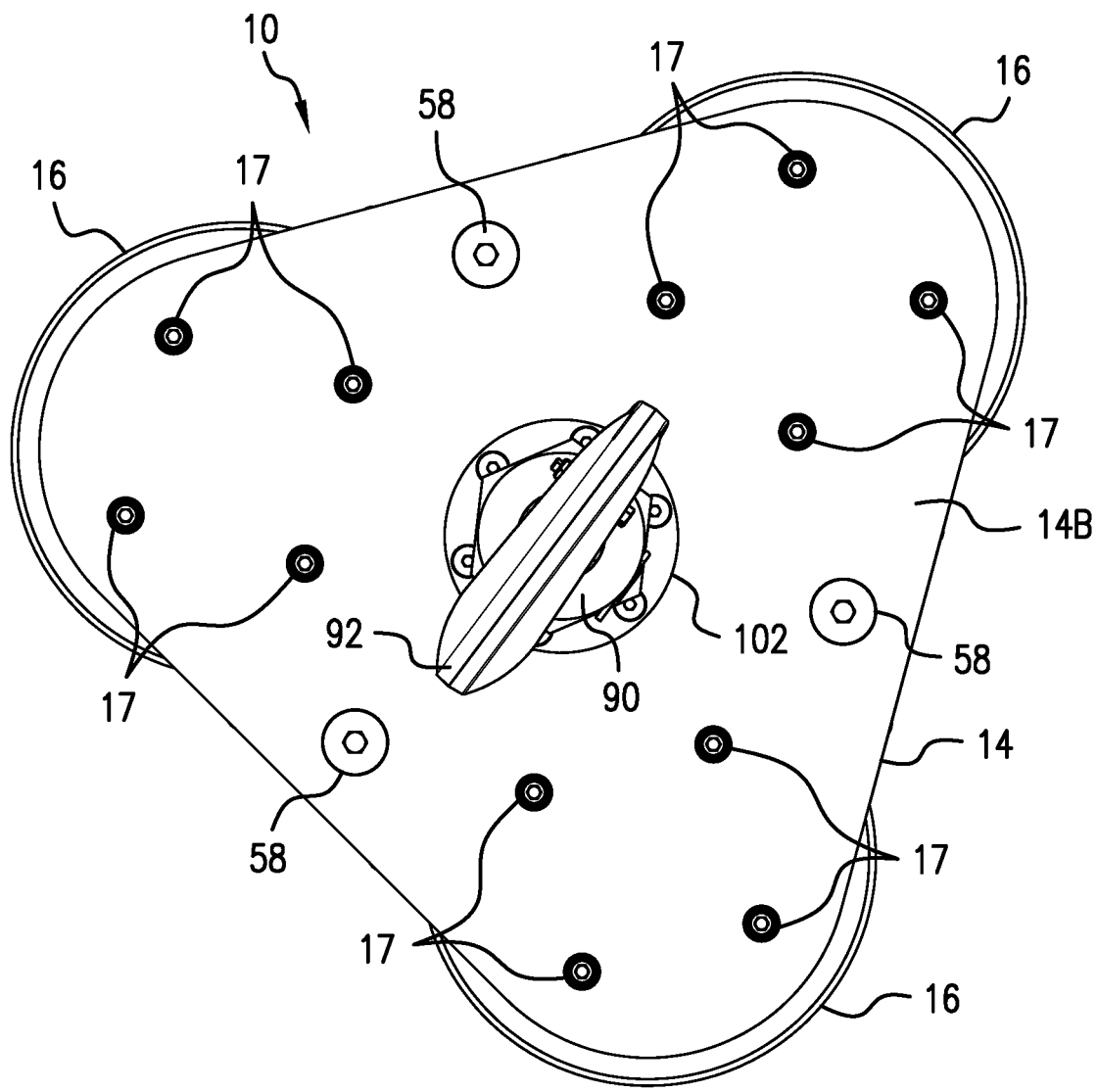
FIG. 5 is a bottom view of the pneumatically adjustable lifting apparatus.

As used herein, the terms "comprises", "comprising", "includes", "including", "has", "having" or any other variation thereof, are intended to cover a non-exclusive inclusion. For example, a process, method, article or apparatus that comprises a list of elements is not necessarily limited to only those elements, but may include other elements not expressly listed or inherent to such process, method, article or apparatus.

Approximating language, as used herein throughout the specification and claims, may be applied to modify any quantitative representation that could permissibly vary without resulting in a change in the basic function to which it is related. Accordingly, a value modified by a term such as "about" or "approximately" is not limited to the precise value specified.

Reference in the specification to "an exemplary embodiment", "one embodiment" or "an embodiment" means that a particular feature, structure or characteristic described in connection with the embodiment is included in at least one embodiment of the invention. The appearances of the phrases "an exemplary embodiment", "one embodiment" or "embodiment" in various places in the specification are not necessarily all referring to the same embodiment.

Referring to FIGS. 1-7, there is shown pneumatically adjustable lifting apparatus 10 in accordance with an exemplary embodiment. In this embodiment, pneumatically adjustable lifting apparatus 10 is configured to lift loads weighing up to about 25,000 pounds. Pneumatically adjustable lifting apparatus 10 comprises top plate 12. Top plate 12 includes top side 12A and bottom side 12B. Pneumatically adjustable lifting apparatus 10 further comprises bottom plate 14. Bottom plate 14 has top side 14A and bottom side 14B. A plurality of inflatable spring devices 16 are positioned between top plate 12 and bottom plate 14. In an exemplary embodiment, there are three inflatable spring devices 16. However, in other embodiments, there may be more or less than three inflatable spring devices 16. Each inflatable air spring 16 has a capacity of about 8,500 lbs. In an exemplary embodiment, each inflatable air spring 16 is a Firestone® Airide™ Air Spring, Model No. 1T15M-9, manufactured by Firestone Industrial Products. The Firestone® Airide™ Air Spring has an extended height of about 24.50 inches, a compressed height of about 7.75 inches and a capacity of about 8,500 lbs. Each inflatable spring device 16 may be inflated with air or with any other common compressed gas such as nitrogen. Each inflatable spring device 16 is attached to top plate 12 and bottom plate 14 via screws 17 that are inserted through corresponding through-holes 18 in top plate 12 and corresponding through-holes 19 in bottom plate 14. Screws 17 are threadedly engaged with corresponding threaded inlets 20 in each inflatable spring device 16. Each inflatable spring device 16 is in gaseous communication with pneumatic network 22. Pneumatic network 22 comprises a plurality of tubing sections, a plurality of connectors or fittings 23 that are in gaseous communication with the tubing sections and a plurality of nipple members 24. Each nipple member 24 is in gaseous communication with a corresponding connector 23. Each nipple member 24 extends through a corresponding through-hole in top plate 12 and through a corresponding opening of an inflatable spring device 16. Thus, each nipple member 24 is in gaseous communication with a corresponding inflatable spring device 16. Air-fill valve 26 and air pressure gauge 28 are in gaseous communication with one of the connectors 23, indicated by reference number 23A. Air inputted into air-fill valve 26 flows through the tubing sections of pneumatic network 22 and through connectors 23 and nipple members 24. The air flowing through nipple members 24 flows into inflatable spring devices 16. Air pressure gauge 28 measures the air or gas pressure within inflatable spring devices 16. In an exemplary embodiment, the tubing of pneumatic network 22 and nipples 24 are fabricated from suitable materials including, but not limited to, plastic, PVC, resin, polycarbonate or lightweight metal. In an exemplary embodiment, connectors 23 have a generally "T" shaped geometry and are fabricated from a suitable metal such as brass, copper or Aluminum.

Referring to FIGS. 1-3 and 6, inflatable spring devices 16 are pre-charged with air at a pressure that corresponds to a particular load that is to be lifted by pneumatically adjustable lifting apparatus 10. Inflatable spring devices 16 compress when under load. Relief valve 30 provides protection against over pressuring inflatable spring devices 16 and therefore functions as a safety device. If inflatable spring devices 16 are compressed such that the internal pressure of inflatable spring devices 16 exceeds a predefined pressure, relief valve 30 automatically vents air from inflatable spring devices 16. As a result, inflatable spring devices 16 deflate until top plate 12 contacts bearing rod stop collars 32. In an exemplary embodiment, the predefined pressure is about 125 PSIG. Bearing rod stop collars 32 are described in the ensuing description. Needle valve 34 is configured for manual operation and when activated, vents pressurized air from inflatable spring devices 16. Pneumatically adjustable lifting apparatus 10 includes muffler fitting 36. Muffler fitting 36 is porous and allows air to pass therethrough. In an exemplary embodiment, muffler fitting 36 is of sintered metal construction. Muffler fitting 36 attenuates the noise from manually venting inflatable spring devices 16 using needle valve 34. Muffler fitting 36 also prevents debris from entering the exhaust side of needle valve 34 thereby ensuring the exhaust air flow from needle valve 34 is not impeded.

Referring to FIGS. 1-3, 5 and 6, pneumatically adjustable lifting apparatus 10 further comprises bearing rod spacer plate 40. Bearing rod spacer plate 40 has central opening 41, the purpose of which is described in the ensuing description. Pneumatically adjustable lifting apparatus 10 also includes a plurality of swivel hoist rings 42. In an exemplary embodiment, each swivel hoist ring 42 is rated for about 10,000 lbs. Each swivel hoist ring 42 has a threaded shank 43 (see FIG. 6) that extends through a corresponding through-hole in bearing rod spacer plate 40. Each swivel hoist ring 42 includes shackle 44 attached thereto. A sling bridle 116 (see FIG. 7) may be attached to each shackle 44. Pneumatically adjustable lifting apparatus 10 includes linear bearing rods 50. Each linear bearing rod 50 has top end 52 and bottom end 54 (see FIG. 6). Top end 52 of each linear bearing rod 50 has a threaded inlet or bore (not shown) which is aligned with a corresponding opening or through-hole 56 in bearing rod spacer plate 40. Threaded shank 43 of each swivel hoist ring 42 extends through the corresponding through-hole 56 and is screwed into a threaded inlet in top end 52 of a corresponding linear bearing rod 50. Bottom end 54 of each linear bearing rod 50 also has a threaded inlet or bore (not shown) that is configured to receive a corresponding bolt or screw 58 (see FIG. 5). Each threaded bolt 58 fits through a corresponding through-hole 60 in bottom plate 14. Therefore, each linear bearing rod 50 is attached or joined to bearing rod spacer plate 40 via a corresponding threaded shank 43 and also attached or joined to bottom plate 14 via bolt 58. Each linear bearing rod 50 is solid, except for the threaded inlets at top end 52 and bottom end 54 thereof.

Figure 6:
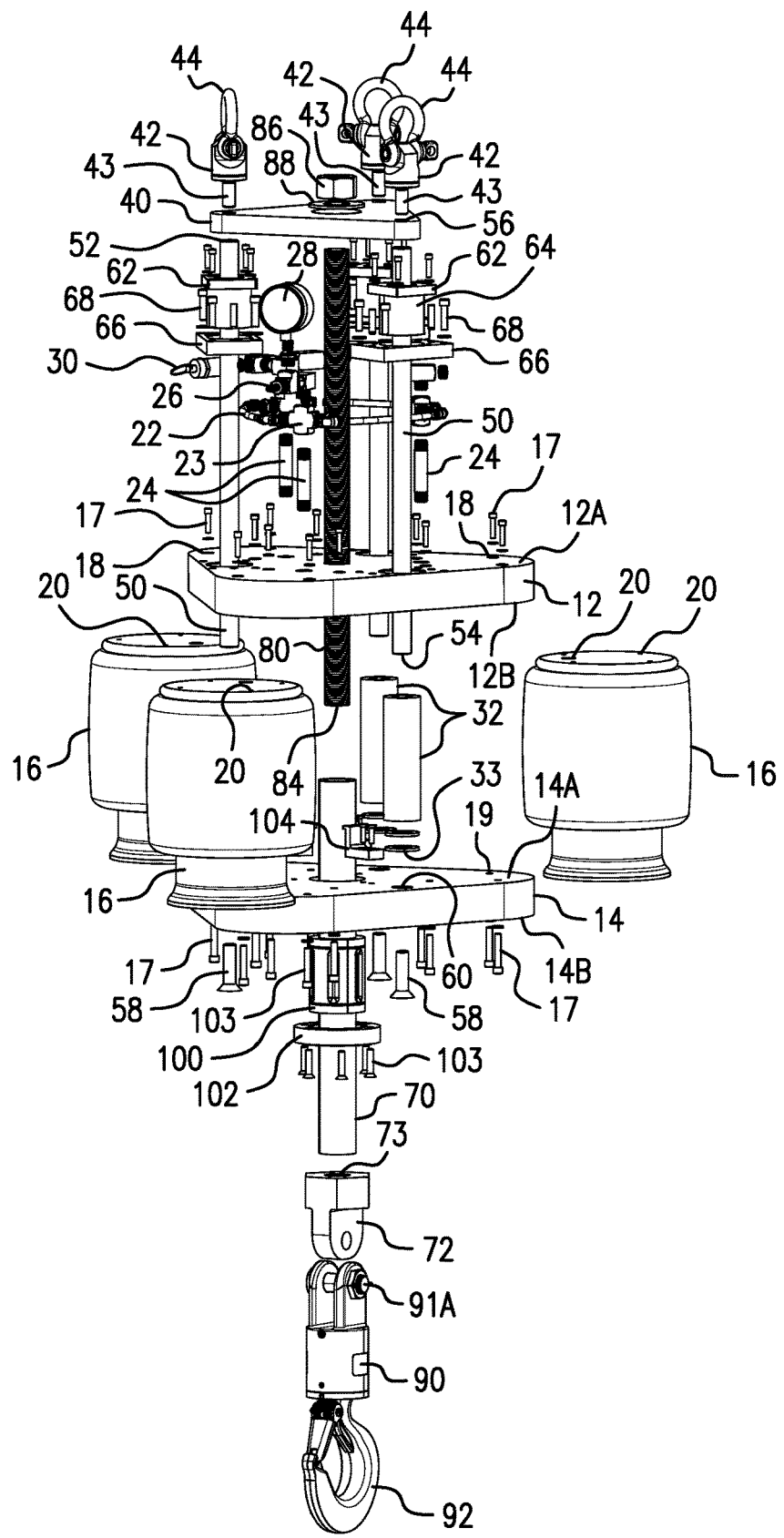
FIG. 6 is an exploded view of the pneumatically adjustable lifting apparatus.

Referring to FIG. 6, each linear bearing rod 50 extends through a corresponding linear ball bearing assembly 62 that is attached to top plate 12. Each linear ball bearing assembly 62 includes bearing housing 64 that has a length that is greater than the thickness of top plate 12. Bearing spacers 66 prevent the bearing housings 64 from protruding or extending from bottom side 12B of top plate 12. Bearing spacers 66 are attached to top plate 12 via screws 68 that are threadedly engaged with threaded inlets or bores in top plate 12. Each linear ball bearing assembly 62 provides a smooth, low friction linear guide for a corresponding linear bearing rod 50. This configuration allows top plate 12 to smoothly slide upon linear bearing rods 50 either in an upward direction or downward direction.

Referring to FIGS. 1-3 and 6, each linear bearing rod 50 extends into corresponding bearing rod stop collar 32. Each bearing rod stop collar 32 is free-floating and functions as a "stop device" that prevents over-compression of inflatable spring devices 16. Hence, if a heavy load causes inflatable spring devices 16 to experience a high degree of compression, bearing rod stop collars 32 limit the downward movement top plate 12. Thus, the maximum downward movement of top plate 12 is reached when top plate 12 contacts the top ends of bearing rod stop collars 32. In an exemplary embodiment, Belleville washers 33 are interposed between bottom end 54 of each linear bearing rod 50 and top side 14A of bottom plate 14. Each Belleville washer 33 has a central opening sized to allow a corresponding screw 58 to pass therethrough. Belleville washers 33 absorb shock energy created by the contact between top plate 12 and bearing rod stop collars 32.

Referring to FIG. 6, pneumatically adjustable lifting apparatus 10 further comprises hollow bearing shaft 70 and a load attachment assembly that includes lower hoist attachment fitting 72 and swivel hook assembly 90, which are described in detail in the ensuing description. Lifting apparatus 10 further comprises threaded rod 80. Threaded rod 80 includes top end portion 82 and bottom end portion 84. Threaded rod 80 extends through hollow bearing shaft 70. Top end portion 82 of threaded rod 80 is attached or secured to top plate 12 by nut 86 and washer 88. An appropriate tool (not shown) may be inserted through central opening 41 in bearing rod spacer plate 40 in order to tighten nut 86. Bottom end portion 84 is screwed into a threaded inlet or bore 73 in lower hoist attachment fitting 72. Hollow bearing shaft 70 has a predetermined length such that the top end of hollow bearing shaft 70 abuts bottom side 12B of top plate 12. The bottom end of hollow bearing shaft 70 abuts lower hoist attachment fitting 72 but is not attached to lower hoist attachment fitting 72. Swivel hook assembly 90 is pivotably attached to lower hoist attachment fitting 72 via bolt 91A and nut 91B. In an exemplary embodiment, a pin extends through bolt 91A in order to prevent nut 91B from falling off of bolt 91A. Swivel hook assembly 90 includes hook 92 that is rotatable 360 degrees.

Referring to FIGS. 1-3 and 6, pneumatically adjustable lifting apparatus 10 further comprises linear recirculating ball bearing assembly 100 and lower bearing keeper assembly 102. Linear recirculating ball bearing assembly 100 guides hollow bearing shaft 70 so as to provide lower hoist attachment fitting 72 with single degree of freedom motion. Linear recirculating ball bearing assembly 100 counteracts any side loading of lower hoist attachment fitting 72 while maintaining low friction. In an exemplary embodiment, linear recirculating ball bearing assembly 100 comprises a bushing type bearing cartridge. Lower bearing keeper assembly 102 provides a body or housing in which the bushing type bearing cartridge is fitted. Lower bearing keeper assembly 102 is attached to bottom plate 14 via screws 103 that are threadedly engaged with corresponding threaded inlets in bottom plate 14. Center bearing keeper 104 prevents the bearing cartridge from moving vertically in an upward direction. Lower bearing keeper assembly 102 is fabricated from a material of sufficient strength to allow it to function as a stop for lower hoist attachment fitting 72. This configuration allows lower hoist attachment fitting 72 to contact lower bearing keeper assembly 102 when pneumatically adjustable lifting apparatus 10 is in a fully extended state as a result of a light load or no load. Linear recirculating ball bearing assembly 100 and lower bearing keeper assembly 102 allow hollow bearing shaft 70 to smoothly move in an upward direction or downward direction with respect to bottom plate 14.

Variations in the forces produced by the load cause the inflatable spring devices 16 to expand or compress thereby allowing soft mating between components that need to be connected together, such as assembling or disassembling large threaded connections. Pneumatically adjustable lifting apparatus 10 maintains a neutral load on the mating threads while allowing for an improved window of travel not available with conventional lifting and placement devices. When there is no load suspended by swivel hook assembly 90, inflatable spring devices 16 fully expand thereby configuring apparatus 10 to a fully extended state.

The thicknesses of top plate 12 and bottom plate 14, the diameters of linear bearing rods 50 and threaded rod 80, the 8,500 lb. rating of each inflatable spring device 16 and the 10,000 lb. rating of swivel hoist rings 42 cooperate to provide pneumatically adjustable lifting apparatus 10 with a lifting capacity of about 25,000 lbs.

Figure 7:
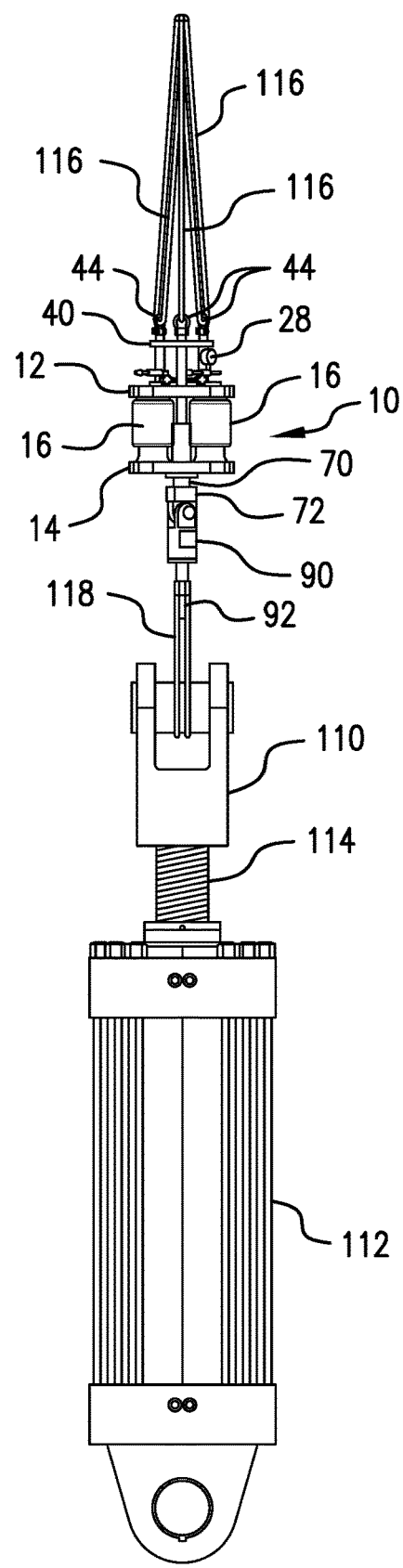
FIG. 7 is an elevational view showing the pneumatically adjustable lifting apparatus being used to screw a clevis onto a hydraulic cylinder.

In order to illustrate the operation of pneumatically adjustable lifting apparatus 10, reference is made to FIG. 7 which shows pneumatically adjustable lifting apparatus 10 being used to thread clevis 110 onto hydraulic cylinder 112. In this example, hydraulic cylinder 112 has an 18 inch bore, a stroke length of 36 inches and upwardly extending rod 114 with male threads. A crane (not shown) is used with pneumatically adjustable lifting apparatus 10. Bridles 116 are attached to the crane and shackles 44. Clevis 110 has a six inch bore with female threads that are configured to be threadedly engaged with the male threads of upwardly extending rod 114. Clevis 110 is secured to hook 92 of swivel hook assembly 90 by steel cable 118. As clevis 110 is being screwed onto hydraulic cylinder 112, threaded rod 80 is subjected to a tensile force which causes threaded rod 80 to be pulled downward. As threaded rod 80 moves downward, top plate 12 will also move downward since threaded rod 80 is secured or attached to top plate 12. As top plate 12 moves downward, it compresses inflatable spring devices 16. After every few turns of clevis 110, the crane operator will lower pneumatically adjustable lifting apparatus 10 slightly in order minimize the load on the threads of upwardly extending rod 114. If clevis 110 is to be unscrewed from hydraulic cylinder 112, then after every few turns of clevis 110, the crane operator would slightly raise pneumatically adjustable lifting apparatus 10 in order to minimize the load on the threads of upwardly extending rod 114.

Referring to FIGS. 8-11, there is shown pneumatically adjustable lifting apparatus 200 in accordance with another exemplary embodiment. In this embodiment, pneumatically adjustable lifting apparatus 200 is configured to lift loads weighing up to about 3000 pounds. Pneumatically adjustable lifting apparatus 200 comprises top plate 202. Top plate 202 includes top side 202A and bottom side 202B. Pneumatically adjustable lifting apparatus 200 further comprises bottom plate 204. Bottom plate 204 has top side 204A and bottom side 204B. A plurality of inflatable spring devices 206 are positioned between top plate 202 and bottom plate 204. In this exemplary embodiment, there are three inflatable spring devices 206. Each air inflatable spring device 206 has a capacity of about 1000 lbs. In an exemplary embodiment, each inflatable spring device 206 is a Firestone® 9001 Ride-Rite™ 110/70 Air Helper Spring, manufactured by Firestone® Industrial Products. The Firestone® 9001 Ride-Rite™ 110/70 Air Helper Spring has an extended height of about 8.37 inches, a compressed height of about 4.37 inches and a capacity of about 1500 lbs. Each inflatable spring device 206 may be inflated with air or any other common compressed gas such as nitrogen. Each inflatable spring device 206 is attached to top plate 202 and bottom plate 204 via screws 207 that are inserted through corresponding through-holes 208 in top plate 202 and corresponding through-holes 209 in bottom plate 204. Screws 207 are threadedly engaged with corresponding threaded inlets 220 in each inflatable spring device 206. Each inflatable spring device 206 is in gaseous communication with pneumatic network 222. Pneumatic network 222 comprises a plurality of tubing sections 222A, a plurality of connectors or fittings 223 that are in gaseous communication with the tubing sections and a plurality of nipple members 224. Each nipple member 224 is in gaseous communication with a corresponding connector 223. Each nipple member 224 extends through a corresponding through-hole in top plate 202 and into opening 225 of a corresponding inflatable spring device 206 such that nipple 224 is in gaseous communication with the corresponding inflatable spring device 206. Air-fill valve 226 and air pressure gauge 228 are in gaseous communication with one of the connectors 223, indicated by reference number 223A. Air inputted into air-fill valve 226 flows through the tubing sections 222A of pneumatic network 222 and through connectors 223 and nipple members 224. The air flowing through nipple members 224 flows into inflatable spring devices 206. Air pressure gauge 228 measures the air or gas pressure within inflatable spring devices 206. In an exemplary embodiment, tubing sections 222A of pneumatic network 222 and nipples 224 are fabricated from suitable materials including, but not limited to, plastic, PVC, resin, polycarbonate or lightweight metal. In an exemplary embodiment, connectors 223 have a generally "T" shaped geometry and are fabricated from a suitable metal such as brass, copper or Aluminum.

Figure 8:
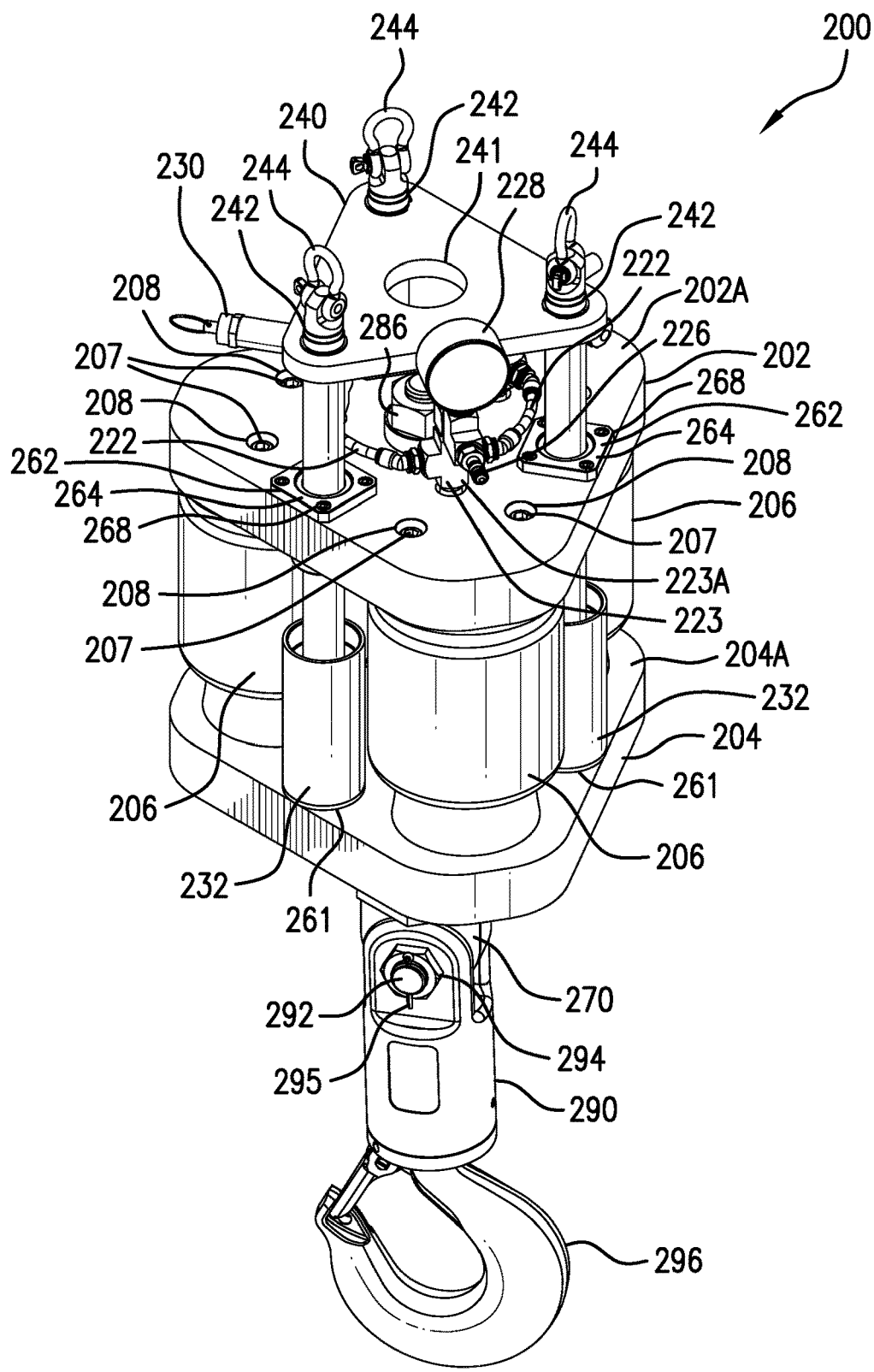
FIG. 8 is a perspective view of a pneumatically adjustable lifting apparatus in accordance with another exemplary embodiment.
Figure 9:
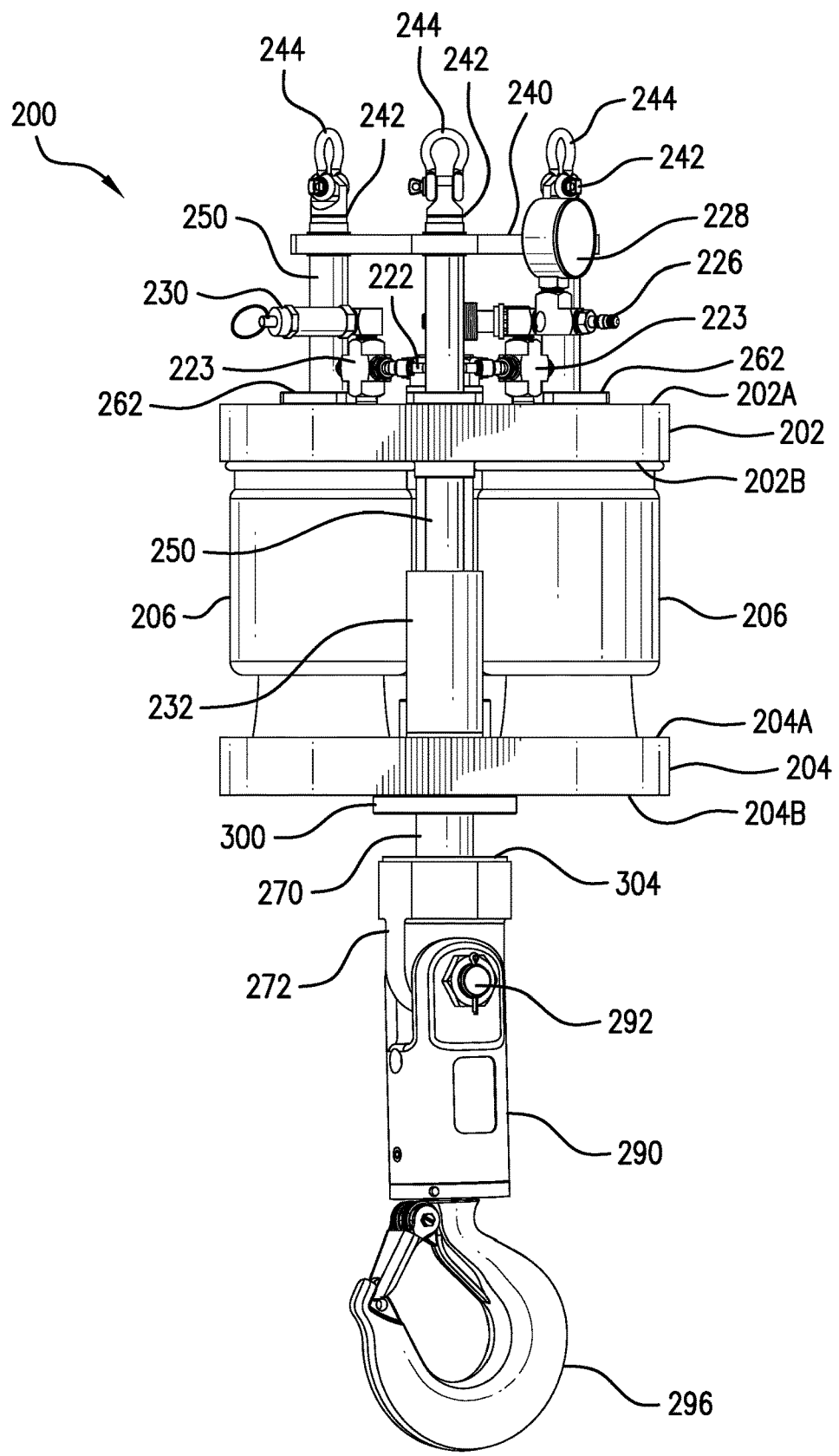
FIG. 9 is a side elevational view of the pneumatically adjustable lifting apparatus of FIG. 8.
Figure 10:
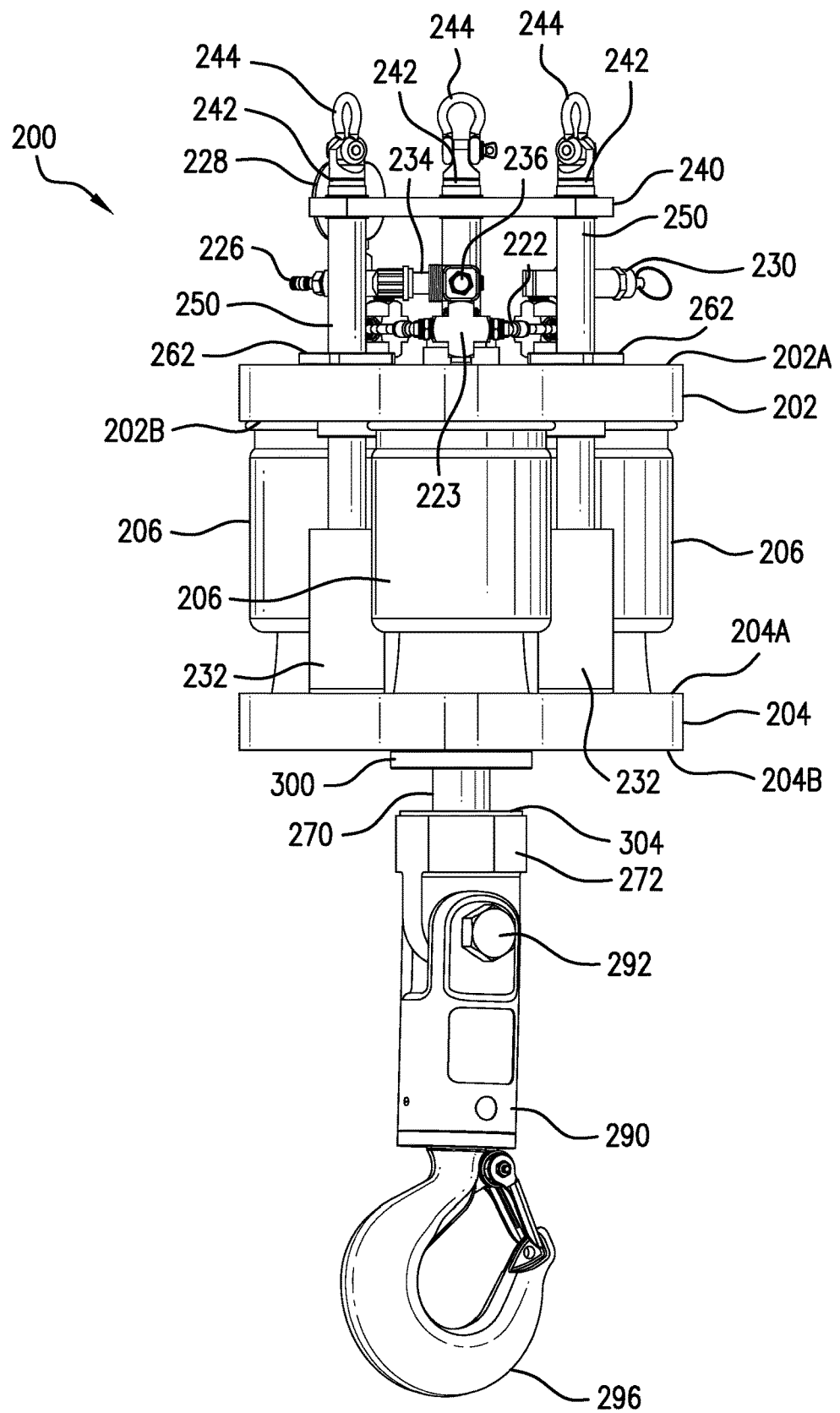
FIG. 10 is a rear view of the pneumatically adjustable lifting apparatus of FIG. 8.

Referring to FIGS. 8-10, inflatable spring devices 206 are pre-charged with air at a predetermined air pressure that corresponds to a particular load that is to be lifted by pneumatically adjustable lifting apparatus 200. Inflatable spring devices 206 compress when under load. Relief valve 230 has the same function as relief valve 30 described in the foregoing description (see FIG. 1). Thus, relief valve 230 provides protection against over pressuring inflatable spring devices 206 and therefore functions as a safety device. If inflatable spring devices 206 are compressed such that the internal pressure of inflatable spring devices 206 exceeds a predefined pressure, relief valve 230 automatically vents air from inflatable spring devices 206. Venting the air causes inflatable spring devices 206 to deflate until top plate 202 contacts bearing rod stop collars 232. In an exemplary embodiment, the predefined pressure is about 125 PSIG. Bearing rod stop collars 232 are described in the ensuing description. Connector 233 is in gaseous communication with pneumatic network 222 and includes valve 234. Valve 234 is configured for manual operation and when activated, vents pressurized air from inflatable spring devices 206. Muffler fitting 236 is connected to connector 233 and is in gaseous communication with pneumatic network 222. Muffler fitting 236 is porous and allows air to pass therethrough when valve 234 is manually activated. In an exemplary embodiment, muffler fitting 236 is of sintered metal construction. Muffler fitting 236 attenuates the noise from manually venting inflatable spring devices 206 using valve 234. Muffler fitting 236 also prevents debris from entering the exhaust side of connector 233 thereby ensuring the exhaust air flow is not impeded.

Figure 11:
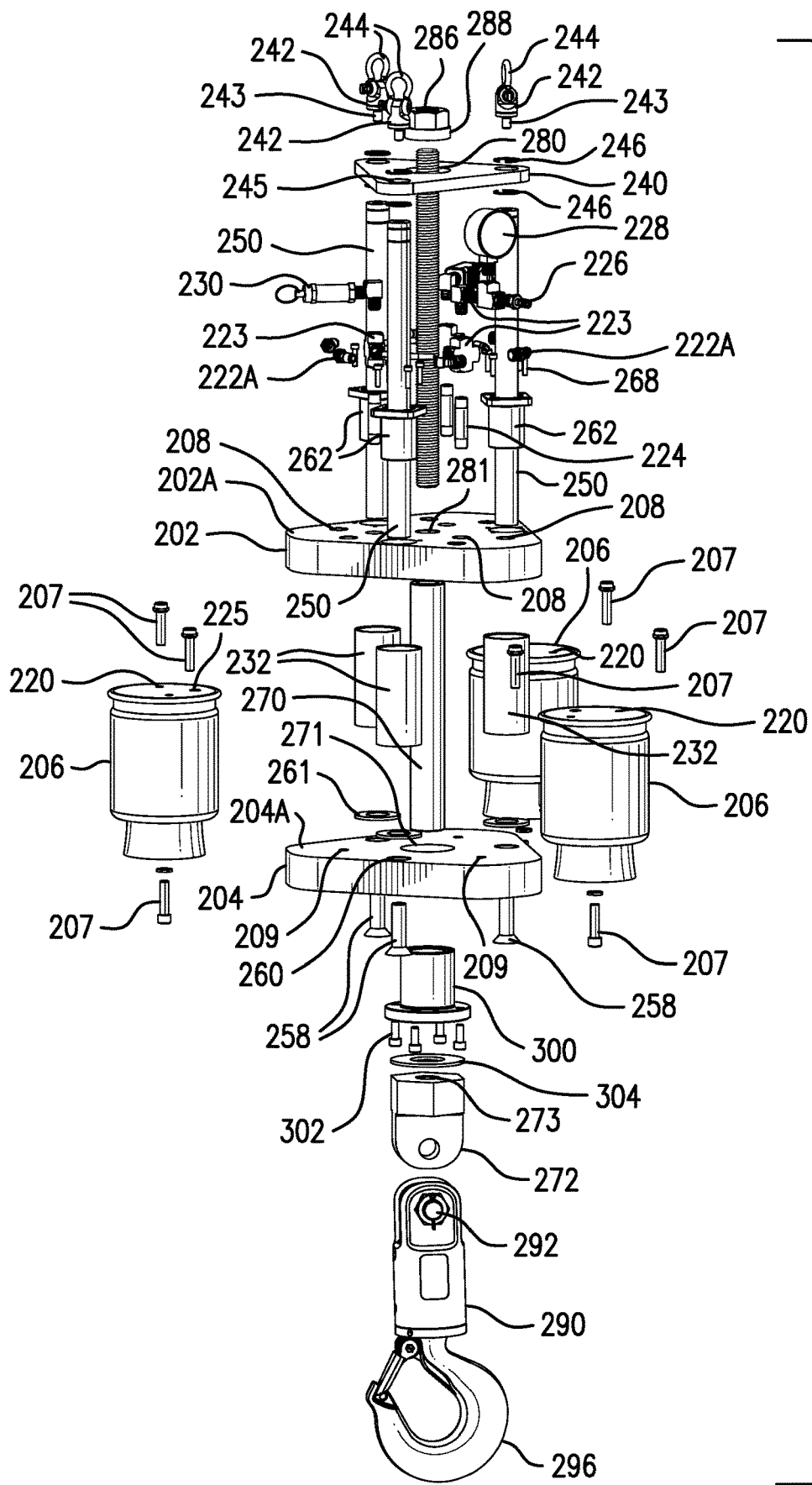
FIG. 11 is an exploded view of the pneumatically adjustable lifting apparatus of FIG. 8.
Figure 12:
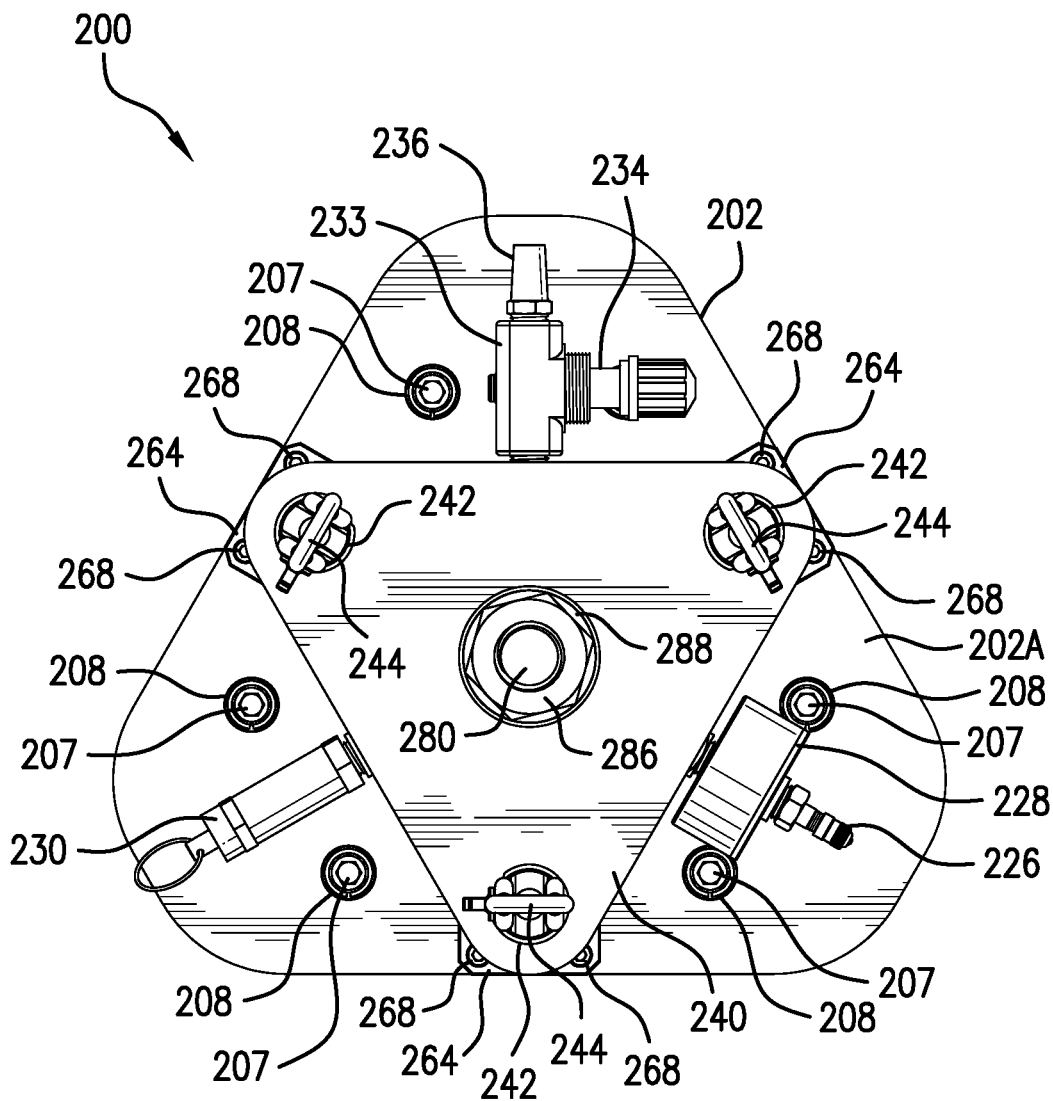
FIG. 12 is a top plan view of the pneumatically adjustable lifting apparatus of FIG. 8.
Figure 13:
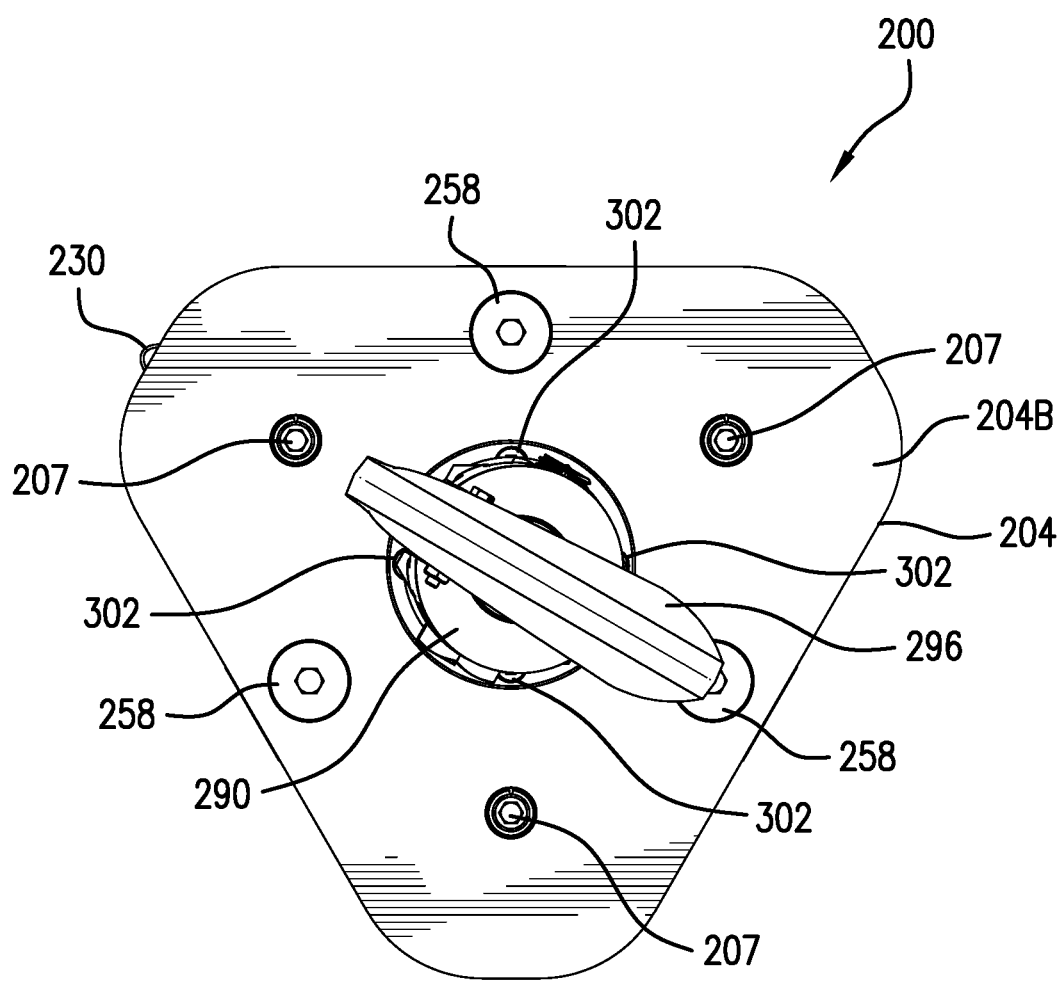
FIG. 13 is a bottom view of the pneumatically adjustable lifting apparatus of FIG. 8.

Referring to FIGS. 8-12, pneumatically adjustable lifting apparatus 200 further comprises bearing rod spacer plate 240. Bearing rod spacer plate 240 has central opening 241, the purpose of which is described in the ensuing description. Pneumatically adjustable lifting apparatus 200 also includes a plurality of swivel hoist rings 242. In an exemplary embodiment, each swivel hoist ring 242 is rated at about 1000 lbs. Each swivel hoist ring 242 has a threaded shank 243 (see FIG. 11). Each swivel hoist ring 242 includes shackle 244 attached thereto. A sling bridle, similar to sling bridle 116 shown in FIG. 7, may be attached to each shackle 244. Each threaded shank 243 extends through a corresponding through-hole 245 in bearing rod spacer plate 240. In an exemplary embodiment, each threaded shank 243 extends through a corresponding retaining ring 246, as shown in FIG. 11, wherein each retaining ring 246 is configured to snap into a groove in a corresponding linear bearing rod 250. Linear bearing rods 250 have substantially the same construction and configuration as linear bearing rods 50 which were described in the foregoing description and shown in FIGS. 1-3 and 6. Each linear bearing rod 250 has a top end and bottom end. Each linear bearing rod 250 is attached to a corresponding threaded shank 243 in the same manner as each linear bearing rod 50 is attached to threaded shank 43 (see FIGS. 1-3 and 6). Accordingly, the top end of each linear bearing rod 250 has a threaded inlet or bore (not shown) into which a corresponding threaded shank 243 is screwed. The bottom end of each linear bearing rod 250 also has a threaded inlet or bore (not shown) that is configured to receive a corresponding threaded bolt or screw 258 (see FIGS. 11 and 13). Therefore, each linear bearing rod 250 is attached or joined to bearing rod spacer plate 240 via a corresponding threaded shank 243 and also attached or joined to bottom plate 204 via threaded bolt 258. Each threaded bolt 258 fits through a corresponding through-hole 260 in bottom plate 204 and through a corresponding rubber washer 261 and then screwed into the threaded inlet or bore in the bottom end of the corresponding linear bearing rod 250. As shown in FIG. 11, each rubber washer 261 is interposed between a corresponding bearing rod stop collar 232 and bottom plate 204. Rubber washers 261 absorb shock energy created by the contact between top plate 202 and bearing rod stop collars 232. In an exemplary embodiment, each rubber washer 261 has a stiffness of about 50 durometer. Each linear bearing rod 250 is solid, except for the threaded inlets or bores at top end and bottom end thereof.

Referring to FIGS. 8 and 11, each linear bearing rod 250 extends through a corresponding linear ball bearing assembly 262 that is attached to top plate 202. Each linear ball bearing assembly 262 includes a flanged bearing housing 264 that has a length that is greater than the thickness of top plate 202. Each flanged bearing housing 264 is attached to top plate 202 via screws 268 that are threadedly engaged with threaded inlets or bores in top plate 202. Each linear ball bearing assembly 262 provides a smooth, low friction linear guide for a corresponding linear bearing rod 250. This configuration allows top plate 202 to smoothly move or slide upon linear bearing rods 250 in an upward direction and in a downward direction.

Referring to FIG. 8, each linear bearing rod 250 extends into corresponding bearing rod stop collar 232. Each bearing rod stop collar 232 is free-floating and functions as a "stop device" that prevents over-compression of inflatable spring devices 206. Hence, if a heavy load causes inflatable spring devices 206 to experience a high degree of compression, bearing rod stop collars 232 limit the downward movement of top plate 202. Thus, the maximum downward movement of top plate 202 is reached when top plate 212 contacts the top ends of bearing rod stop collars 232.

Referring to FIGS. 8, 9, 11 and 12, pneumatically adjustable lifting apparatus 200 further comprises hollow bearing shaft 270 that is sized to fit through central opening 271 in bottom plate 204. Lifting apparatus 200 further comprises a load attachment assembly that comprises lower hoist attachment fitting 272 and swivel hook assembly 290, which are described in detail in the ensuing description. Lifting apparatus 200 further comprises threaded rod 280. Threaded rod 280 has the same function as threaded rod 80 which is shown in FIG. 6 and discussed in the foregoing description. Threaded rod 280 extends through central opening 281 in top plate 202 and through hollow bearing shaft 270. Threaded rod 280 is attached or secured to top plate 202 by nut 286 and washer 288. An appropriate tool (not shown) may be inserted through central opening 241 in bearing rod spacer plate 240 in order to tighten nut 286. The bottom portion of threaded rod 280 is screwed into a threaded inlet or bore 273 in lower hoist attachment fitting 272. Hollow bearing shaft 270 has a predetermined length such that the top end of hollow bearing shaft 270 abuts bottom side 202B of top plate 202. The bottom end of hollow bearing shaft 270 abuts lower hoist attachment fitting 272 but is not attached to lower hoist attachment fitting 272. Pneumatically adjustable lifting apparatus 200 further comprises swivel hook assembly 290 that is pivotably attached to lower hoist attachment fitting 272 by bolt 292 and nut 294. In an exemplary embodiment, pin 295 extends through bolt 292 to prevent nut 294 from becoming disengaged from bolt 292 (see FIG. 8). Swivel hook assembly 290 includes hook 296 that can rotate 360 degrees. Swivel hook assembly 290 has the same function and purpose as swivel hook assembly 90 shown in FIG. 1 and discussed in the foregoing description.

Referring to FIGS. 9-11, pneumatically adjustable lifting apparatus 200 further comprises flanged mounted linear bearing assembly 300. Hollow bearing shaft 270 passes through and is movably engaged with linear bearing assembly 300. Linear bearing assembly 300 guides hollow bearing shaft 270 so as to provide lower hoist attachment fitting 272 with a single degree of freedom motion. Linear bearing assembly 300 counteracts any side loading of lower hoist attachment fitting 272 while maintaining low friction. Linear bearing assembly 300 allows hollow bearing shaft 270 to smoothly move upward or downward with respect to bottom plate 204. Linear bearing assembly 300 is attached or joined to bottom plate 204 via screws 302 which are threadedly engaged with corresponding threaded inlets in bottom plate 204. Rubber washer or bumper 304 (see FIG. 8) is interposed between linear bearing assembly 300 and lower hoist attachment fitting 272. Rubber washer or bumper 304 has a stiffness of about 50 durometer and an outer diameter of about 3.25 inches. Rubber washer or bumper 304 is configured with a central opening through which threaded rod 280 passes.

Pneumatically adjustable lifting apparatus 200 functions in the same manner as pneumatically adjustable lifting apparatus 10. Pneumatically adjustable lifting apparatus 200 can also be used to mate clevis 110 to hydraulic cylinder 112 which are shown in FIG. 7. Thus, bridles (not shown) are attached to a crane and shackles 244 and the load is secured to hook 296 via a cable. As a result of the load, threaded rod 280 is subjected to a tensile force. The tensile force causes threaded rod 280 to be pulled downward. As threaded rod 280 moves downward, top plate 202 also moves downward toward bottom plate 204. As top plate 202 moves downward, it compresses inflatable spring devices 206. The crane raises or lowers pneumatically adjustable lifting apparatus 200 as needed in order to minimize load forces on the components that are to be attached or joined together.

The thicknesses of top plate 202 and bottom plate 204, the diameters of linear bearing rods 250 and threaded rod 280, the 1,500 lb. capacity rating of each inflatable spring device 206 and the 1,000 lb. rating of swivel hoist rings 242 cooperate to provide pneumatically adjustable lifting apparatus 200 with a lifting capacity up to about 3,000 lbs.

Figure 14:
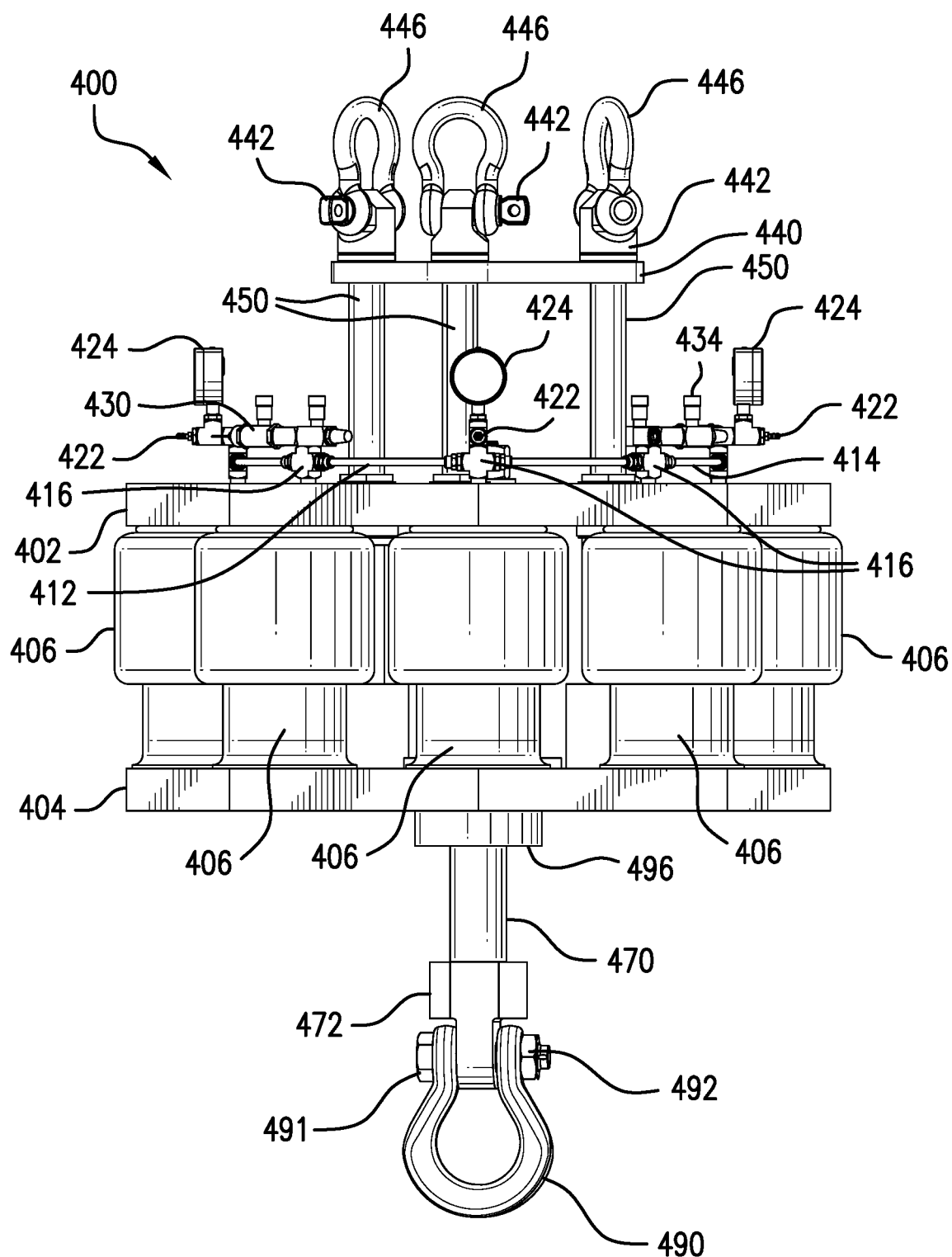
FIG. 14 is a front elevational view of a pneumatically adjustable lifting apparatus in accordance with another exemplary embodiment.
Figure 15:
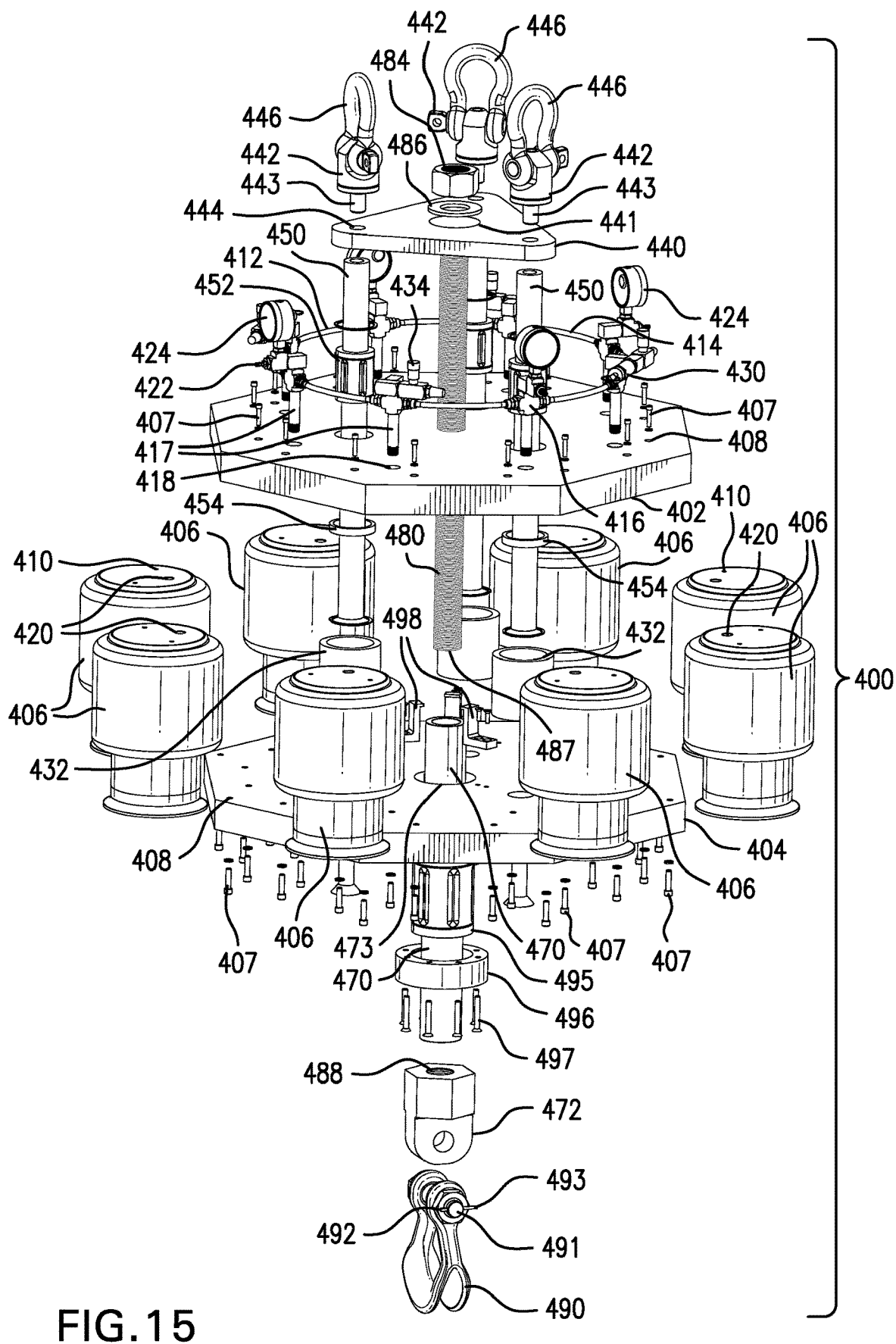
FIG. 15 is an exploded view of the pneumatically adjustable lifting apparatus of FIG. 14.
Figure 16:
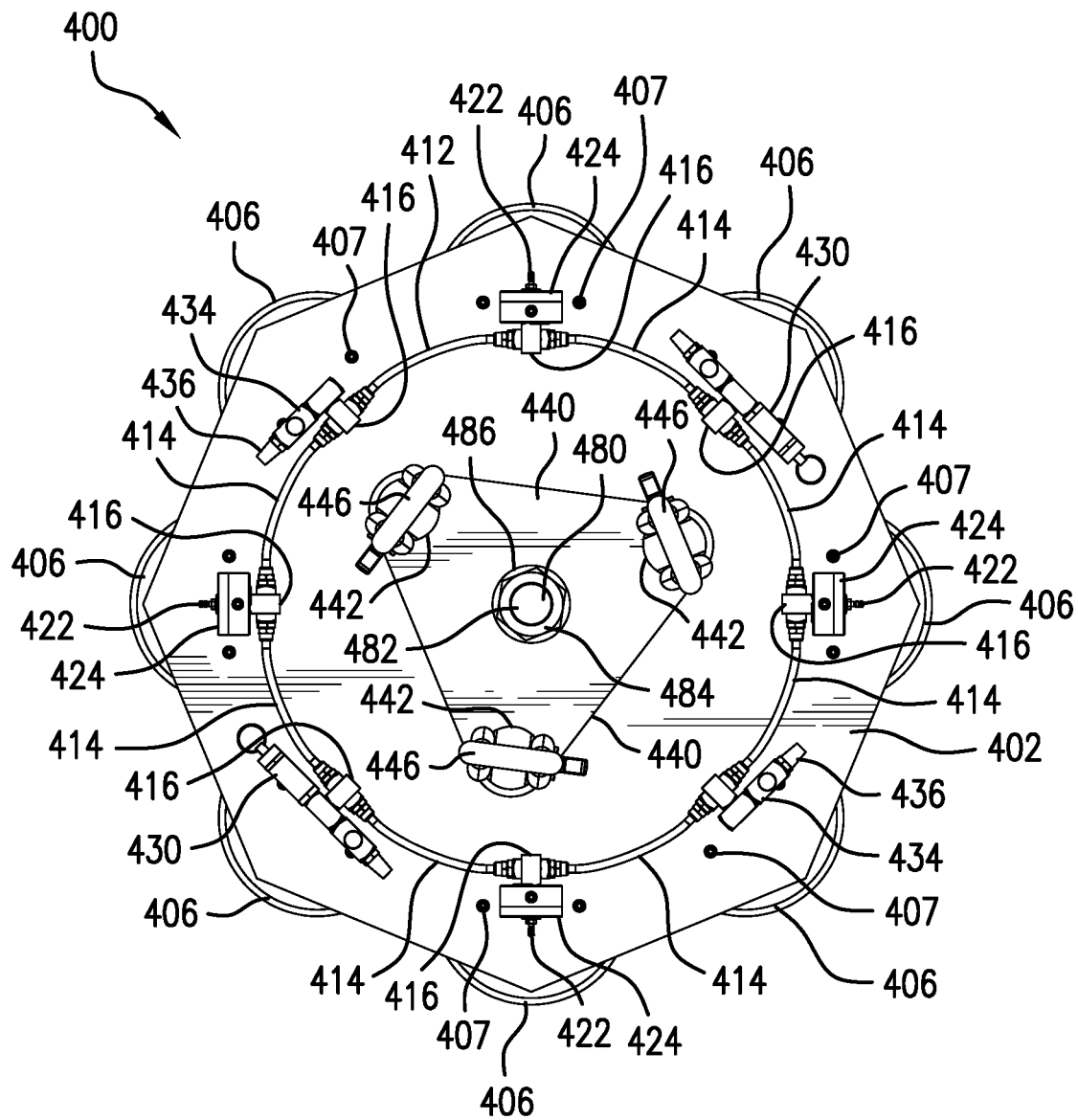
FIG. 16 is a top plan view of the pneumatically adjustable lifting apparatus of FIG. 14.

Referring to FIGS. 14-16, there is shown pneumatically adjustable lifting apparatus 400 in accordance with another exemplary embodiment. In this embodiment, pneumatically adjustable lifting apparatus 400 is configured to lift loads weighing up to about 65,000 pounds. Pneumatically adjustable lifting apparatus 400 comprises top plate 402 and bottom plate 404 which have the same function as top plate 12 and bottom plate 14, respectively, of pneumatically adjustable lifting apparatus 10. Since the load capacity of pneumatically adjustable lifting apparatus 400 is greater than that of pneumatically adjustable lifting apparatus 10, the thicknesses of top plate 402 and bottom plate 404 are significantly greater than the thicknesses of top plate 12 and top plate 14, respectively. Pneumatically adjustable lifting apparatus 400 further comprises a plurality of inflatable spring devices 406 that are positioned between top plate 402 and bottom plate 404. In this embodiment, there are eight inflatable spring devices 406. However, in other embodiments, there may be more or less than eight inflatable spring devices 406. Inflatable spring devices 406 function in the same manner as inflatable spring devices 16 of pneumatically adjustable lifting apparatus 10. In this embodiment, each inflatable spring device 406 has a capacity of about 8,500 lbs. In an exemplary embodiment, each inflatable spring device 406 is a Firestone® Airide™ Air Spring, Model No. 1T15M-9 which was described in the foregoing description. Each inflatable spring device 406 is attached to top plate 402 and bottom plate 404 in the same manner in which inflatable spring devices 16 are attached to top plate 12 and bottom plate 14 (see FIG. 6). Thus, screws 407 are inserted through corresponding through-holes 408 in top plate 402 and bottom plate 404 and threadedly engaged with threaded inlets 410 in each inflatable spring device 406. Each inflatable spring device 406 is in gaseous communication with pneumatic network 412. The function of pneumatic network 412 is the same as the function as pneumatic network 222 of pneumatically adjustable lifting apparatus 200. Pneumatic network 412 comprises a plurality of tubing sections 414, a plurality of connectors or fittings 416 that are in gaseous communication with tubing sections 414 and a plurality of nipple members 417. Nipple members 417 have the same configuration, function and purpose as nipple members 24 of pneumatically adjustable lifting apparatus 10. Each nipple member 417 is in gaseous communication with a corresponding connector 416 and extends through a corresponding through-hole 418 in top plate 402 and through a corresponding opening 420 in an inflatable spring device 406. Thus, each nipple member 417 is in gaseous communication with a corresponding inflatable spring device 406. Air-fill valves 422 and air pressure gauges 424 are in gaseous communication with connectors 416 and have the same configuration, function and purpose as air-fill valve 26 and air-pressure gauge 28, respectively, of pneumatically adjustable lifting apparatus 10.

Referring to FIGS. 14-16, relief valve 430 provides protection against over pressuring inflatable spring devices 406 and therefore functions as a safety device. If inflatable spring devices 406 are compressed such that the internal pressure of the inflatable spring devices 406 exceeds a predefined pressure, relief valve 430 automatically vents air from inflatable spring devices 406. Venting the air causes inflatable spring devices 406 to deflate until top plate 402 contacts bearing rod stop collars 432. Bearing rod stop collars 432 are described in the ensuing description. Pneumatically adjustable lifting apparatus 400 further comprises needle valves 434 and muffler fitting 436 that are in gaseous communication with pneumatic network 412 and have the same configuration, function and purpose as needle valve 34 and muffler fitting 36, respectively, of pneumatically adjustable lifting apparatus 10.

Referring to FIGS. 14-16, pneumatically adjustable lifting apparatus 400 further comprises bearing rod spacer plate 440 which performs the same function as bearing rod spacer plate 40 of pneumatically adjustable lifting apparatus 10. In this embodiment, bearing rod spacer plate 440 has a thickness that is substantially greater than the thickness of bearing rod spacer plate 40 in view of the greater load capacity of pneumatically adjustable lifting apparatus 400.

Figure 17:
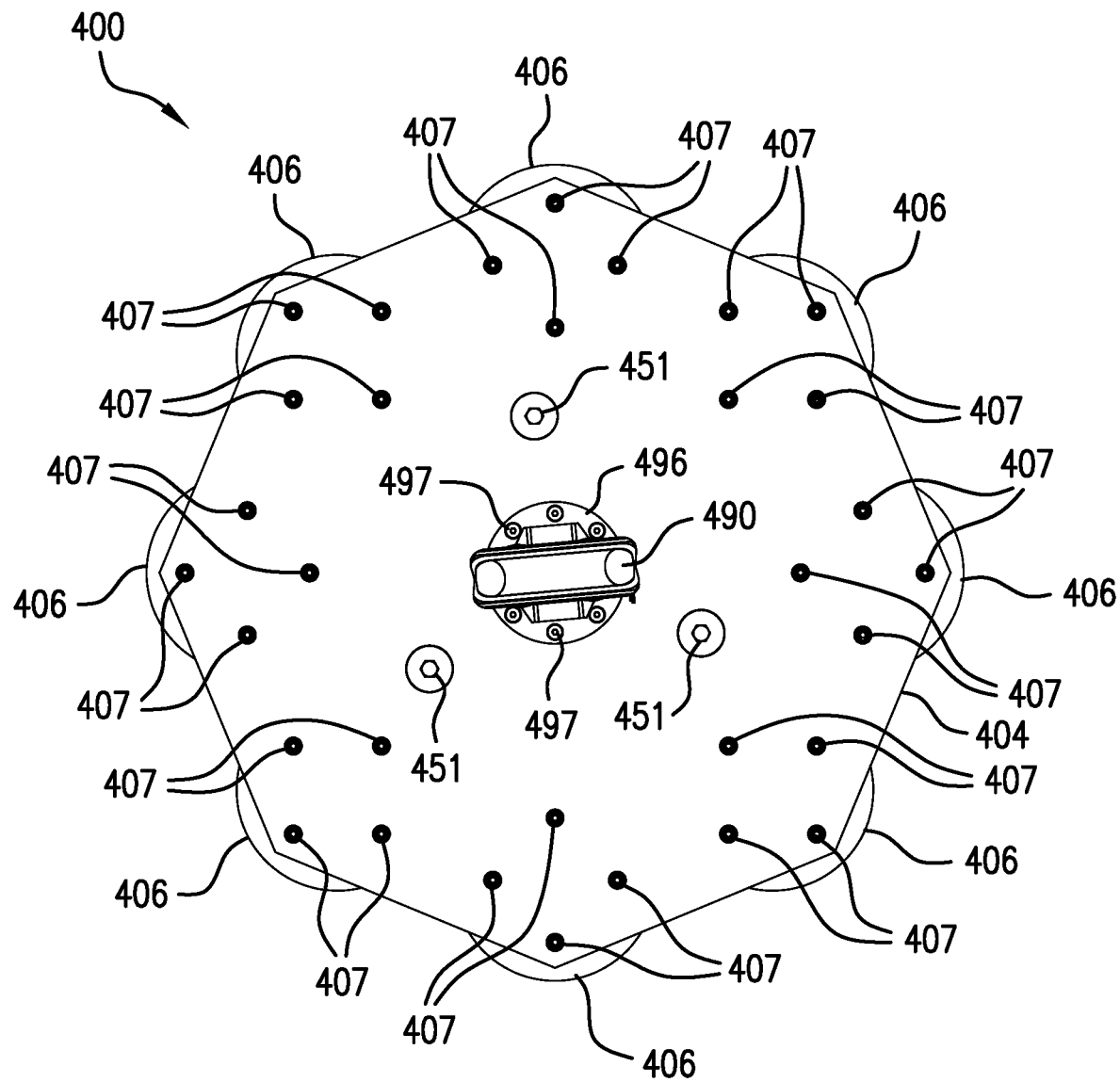
FIG. 17 is a bottom view of the pneumatically adjustable lifting apparatus of FIG. 14.

Bearing rod spacer plate 440 has central opening 441 which has the same function and purpose as central opening 41 in bearing rod spacer plate 40. Pneumatically adjustable lifting apparatus 400 also includes a plurality of swivel hoist rings 442. In an exemplary embodiment, each swivel hoist ring 442 is rated for about 24,000 lbs. Each swivel hoist ring 442 has a threaded shank 443 that is similar to threaded shank 43 of swivel hoist ring 42 of pneumatically adjustable lifting apparatus 10 (see FIG. 6). Threaded shank 443 of each swivel hoist ring 442 extends through a corresponding through-hole 444 in bearing rod spacer plate 440. Each swivel hoist ring 442 includes shackle 446 attached thereto. A sling bridle (not shown) may be attached to each shackle 446. Pneumatically adjustable lifting apparatus 400 includes linear bearing rods 450. Linear bearing rods 450 perform the same function as linear bearing rods 50 of pneumatically adjustable lifting apparatus 10. Each linear bearing rod 450 has the same configuration as a linear bearing rod 50 except that linear bearing rod has a greater diameter in order to sustain the greater load capacity of pneumatically adjustable lifting apparatus 400. Each linear bearing rod 450 is attached to bearing spacer plate 440 and bottom plate 404 in the same manner in which each linear bearing rod 50 is attached to bearing rod spacer plate 40 and bottom plate 14 of pneumatically adjustable lifting apparatus 10. As shown in FIG. 17, each screw 451 extends through an opening in bottom plate 404 and is threadedly engaged with a threaded bore in the bottom end of a corresponding linear bearing rod 450. Each linear bearing rod 450 extends through and is movably engaged with a corresponding linear ball bearing assembly 452 that is attached to top plate 402. Each linear ball bearing assembly 452 extends through a corresponding opening in top plate 402. Linear ball bearing assemblies 452 perform the same function as linear ball bearing assemblies 62 of pneumatically adjustable lifting apparatus 10. Linear ball bearing assemblies 452 are larger in size in comparison to linear ball bearing assemblies 62 in order to sustain the greater load lifting capacity of pneumatically adjustable lifting apparatus 400. Bearing keepers 454 are attached to top plate 402 and located on the bottom side of top plate 402 and prevent linear ball bearing assemblies 452 from slipping through the corresponding openings in top plate 402. Each linear ball bearing assembly 452 provides a smooth, low friction linear guide for a corresponding linear bearing rod 450. This configuration allows top plate 402 to smoothly move or slide upon linear bearing rods 450 in either an upward direction or a downward direction.

Referring to FIGS. 14 and 15, each linear bearing rod 450 extends into corresponding bearing rod stop collar 432. Bearing rod stop collars 432 perform the same function as bearing rod stop collars 32 of pneumatically adjustable lifting apparatus 10. Thus, each bearing rod stop collar 432 is free-floating and functions as a "stop device" that prevents over-compression of inflatable spring devices 406. Hence, if a heavy load causes inflatable spring devices 406 to experience a high degree of compression, bearing rod stop collars 432 limit the downward movement of top plate 402. Thus, the maximum downward movement of top plate 402 is reached when top plate 402 contacts the top ends of bearing rod stop collars 432.

Referring to FIGS. 14, 15 and 17, pneumatically adjustable lifting apparatus 400 further comprises hollow bearing shaft 470 and a load attachment assembly that comprises lower hoist attachment fitting 472 and lower shackle 490, which are described in the ensuing description. Hollow bearing shaft 470 and lower hoist attachment fitting 472 perform the same function as hollow bearing shaft 70 and lower hoist attachment fitting 72, respectively, of pneumatically adjustable lifting apparatus 10. Hollow bearing shaft 470 extends through central opening 473 in bottom plate 404. The bottom end of hollow bearing shaft 470 abuts lower hoist attachment fitting 472 but is not attached to lower hoist attachment fitting 472. Pneumatically adjustable lifting apparatus 400 further comprises threaded rod 480 which performs the same function as threaded rod 80 of pneumatically adjustable lifting apparatus 10. Threaded rod 480 extends through a corresponding central opening in top plate 402 and through hollow bearing shaft 470. Threaded rod 480 is attached or secured to top plate 402 and also attached to lower hoist attachment fitting 472. Specifically, threaded rod 480 includes top end portion 482 that is attached or secured to top plate 402 by nut 484 and washer 486 (see FIG. 16). Threaded rod 480 includes a bottom end portion 487 that is screwed into a threaded inlet or bore 488 in lower hoist attachment fitting 472. Hollow bearing shaft 470 has a predetermined length such that the top end of hollow bearing shaft 470 abuts the bottom side of top plate 402. An appropriate tool (not shown) may be inserted through central opening 441 in bearing rod spacer plate 440 in order to tighten nut 484. Lower shackle 490 is pivotably attached to lower hoist attachment fitting 472 via bolt 491 and nut 492. Such a configuration allows shackle 490 to pivot with respect to lower hoist attachment fitting 472. In an exemplary embodiment, pin 493 extends through bolt 491 in order to prevent nut 492 from falling off of bolt 491.

Referring to FIGS. 14 and 15, pneumatically adjustable lifting apparatus 400 further comprises a linear recirculating ball bearing assembly 495 and lower bearing keeper assembly 496 which perform the same function and have the same configuration as linear recirculating ball bearing assembly 100 and lower bearing keeper assembly 102, respectively, of pneumatically adjustable lifting apparatus 10. Linear recirculating ball bearing assembly 495 guides hollow bearing shaft 470 so as to provide lower hoist attachment fitting 472 with a single degree-of-freedom motion and also counteracts any side loading of lower hoist attachment fitting 472 while maintaining low friction. Lower bearing keeper assembly 496 provides a body or housing in which the bushing type bearing cartridge of the linear recirculating ball bearing assembly 495 is fitted. Lower bearing keeper assembly 496 is attached to bottom plate 404 via screws 497 that are threadedly engaged with corresponding threaded inlets or openings in bottom plate 404. Lower bearing keeper assembly 496 is fabricated from a material of sufficient strength to allow it to function as a stop for lower hoist attachment fitting 472. This configuration allows lower hoist attachment fitting 472 to contact lower bearing keeper assembly 496 when pneumatically adjustable lifting apparatus 400 is fully extended as a result of a light load or no load. Pneumatically adjustable lifting apparatus 400 further includes center bearing keepers 498 which prevent linear recirculating ball bearing assembly 495 from sliding upward and out of central opening 473 in bottom plate 404.

The thicknesses of top plate 402 and bottom plate 404, the diameters of linear bearing rods 450 and threaded rod 480, the 8,500 lb. rating of each inflatable spring device 406 and the 24,000 lb. rating of swivel hoist rings 442 cooperate to provide pneumatically adjustable lifting apparatus 400 with a lifting capacity of about 65,000 lbs.

Figure 18:
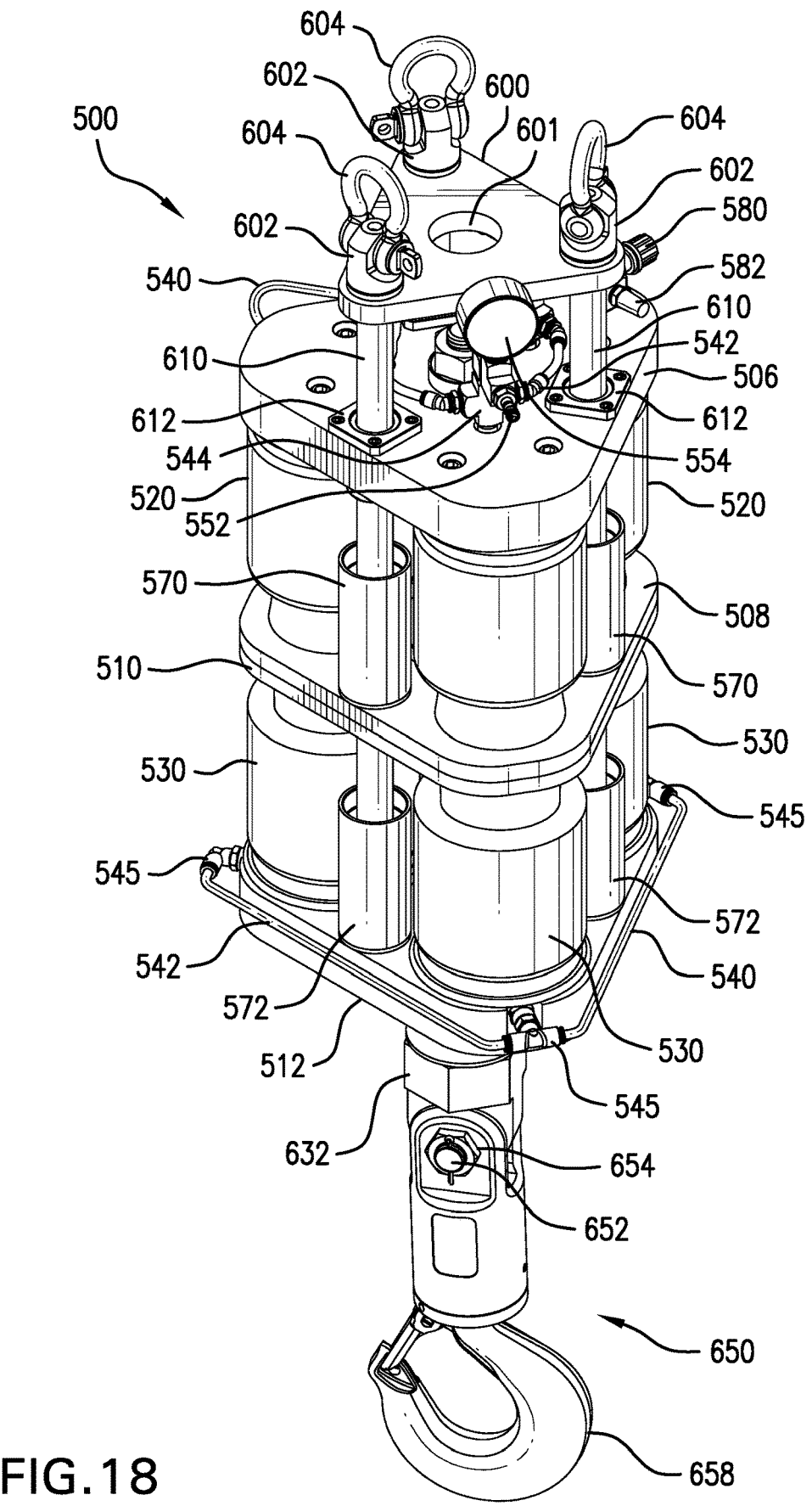
FIG. 18 is perspective view of a pneumatically adjustable lifting apparatus in accordance with another exemplary embodiment.
Figure 19:
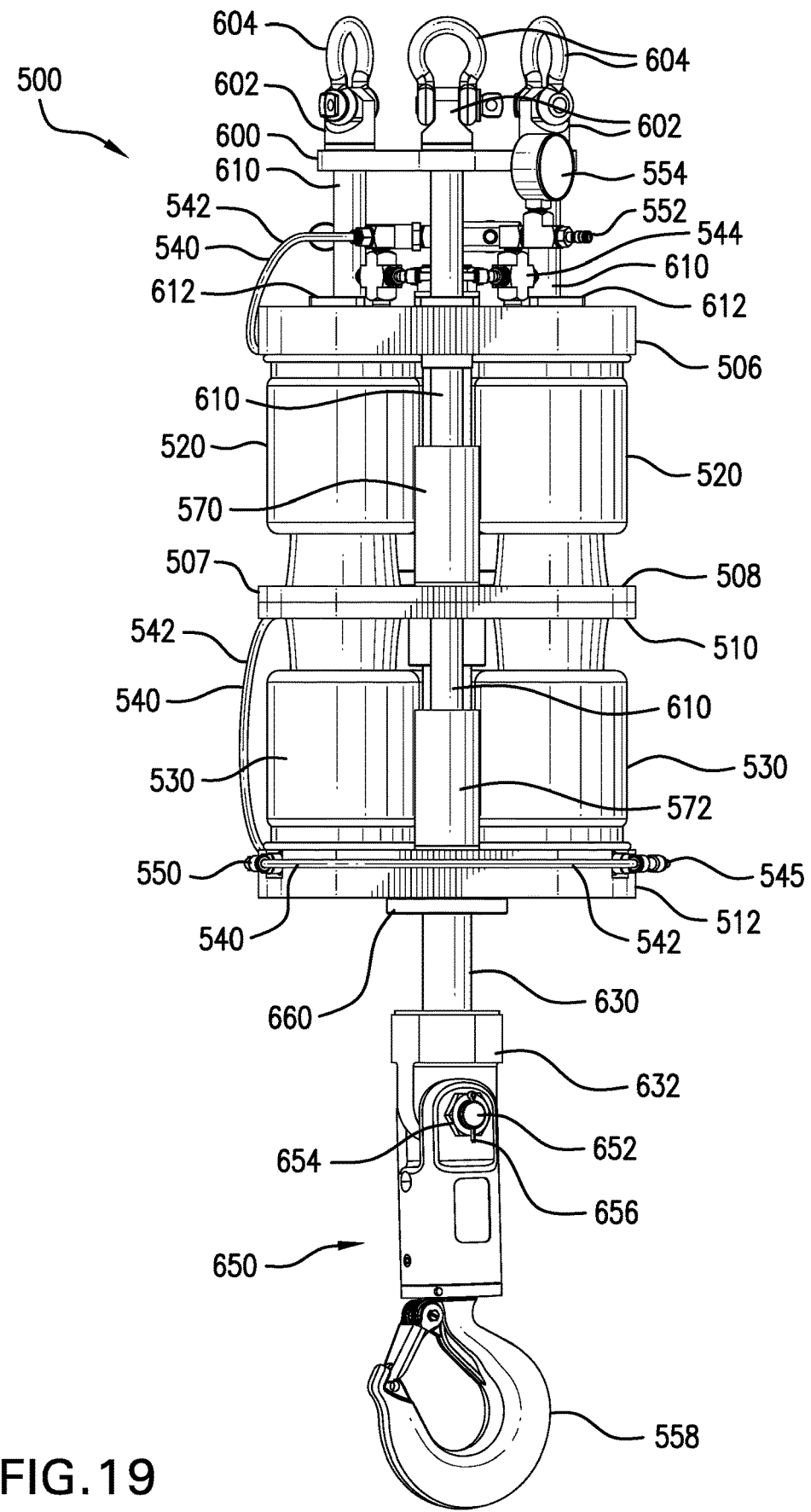
FIG. 19 is right side elevational view of the pneumatically adjustable lifting apparatus of FIG. 18.

Referring to FIGS. 18-21, there is shown pneumatically adjustable lifting apparatus 500 in accordance with another exemplary embodiment. In this embodiment, pneumatically adjustable lifting apparatus 500 is configured to lift loads weighing up to about 3,000 pounds and exhibits linear travel that is about twice the linear travel exhibited by pneumatically adjustable lifting apparatus 200. Pneumatically adjustable lifting apparatus 500 comprises top plate 506 and intermediate plate structure 507. Intermediate plate structure 507 comprises coupler plates 508 and 510 that are attached or joined together. Pneumatically adjustable lifting apparatus 500 further comprises bottom plate 512. Coupler plates 508 and 510 are attached together by any suitable means, e.g. bolts, screws, etc. A first plurality of inflatable spring devices 520 are positioned between and attached to top plate 506 and intermediate plate structure 507. In this embodiment, there are three inflatable spring devices 520 between top plate 506 and intermediate plate structure 507. Specifically, inflatable spring devices 520 are attached to top plate 506 and coupler plate 508. Any of the techniques described in the foregoing embodiments may be used to attach inflatable spring devices 520 top plate 506 and coupler plate 508. A second plurality of inflatable spring devices 530 are positioned between and attached to intermediate plate structure 507 and bottom plate 512. Specifically, inflatable spring devices 530 are attached to coupler plate 510 and bottom plate 512. Any of the techniques described in the foregoing embodiments may be used to attach inflatable spring devices 530 to coupler plate 510 and bottom plate 512. In this embodiment, there are three inflatable spring devices 530 positioned between intermediate plate structure 507 and bottom plate 512. Each inflatable spring device 520 and 530 has a capacity of about 1500 lbs. In an exemplary embodiment, each inflatable spring device 520 and 530 is a Firestone® 9001 Ride-Rite™ 110/70 Air Helper Spring which is discussed in the foregoing description. Inflatable spring devices 520 and 530 may be inflated with compressed air or any other common compressed gas such as nitrogen. As shown in FIG. 19, in an exemplary embodiment, inflatable spring devices 520 are positioned right side up and inflatable spring devices 530 are positioned upside down.

Pneumatically adjustable lifting apparatus 500 comprises pneumatic network 540 that is in gaseous communication with all inflatable spring devices 520 and 530. Pneumatic network 540 comprises tubing sections 542 and connectors 544 that perform the same functions as tubing sections 222A and connectors 223, respectively, of pneumatically adjustable lifting apparatus 200. Pneumatic network 540 also includes "T" connectors, ninety-degree connectors and additional fittings, collectively referred to by reference number 545, that interconnect tubing sections 542. Pneumatic network 540 is secured to top plate 506 and coupler plate 508 via clamps 550 and is also secured to bottom plate 512 via one or more clamps 550. Nipple members (not shown) having the same configuration as nipple members 224 of pneumatically adjustable lifting apparatus 200 are in gaseous communication with pneumatic network 540. Each of these nipple members feed air or gas to a corresponding inflatable spring devices 520 and 530. In an exemplary embodiment, the nipple members are positioned in corresponding through-holes in top plate 506 and bottom plate 512 in order to introduce pressurized gas into inflatable spring devices 520 and inflatable spring devices 530, respectively. However, in other embodiments, the nipple members may be positioned at other locations on plates 506, 508, 510 and 512 in order to introduce the pressurized gas to inflatable spring devices 520 and 530. Air-fill valve 552 and air pressure gauge 554 are in gaseous communication with one of the connectors 544 and have the same configuration, function and purpose as air-fill valve 226 and air-pressure gauge 228, respectively, of pneumatically adjustable lifting apparatus 200.

Figure 21:
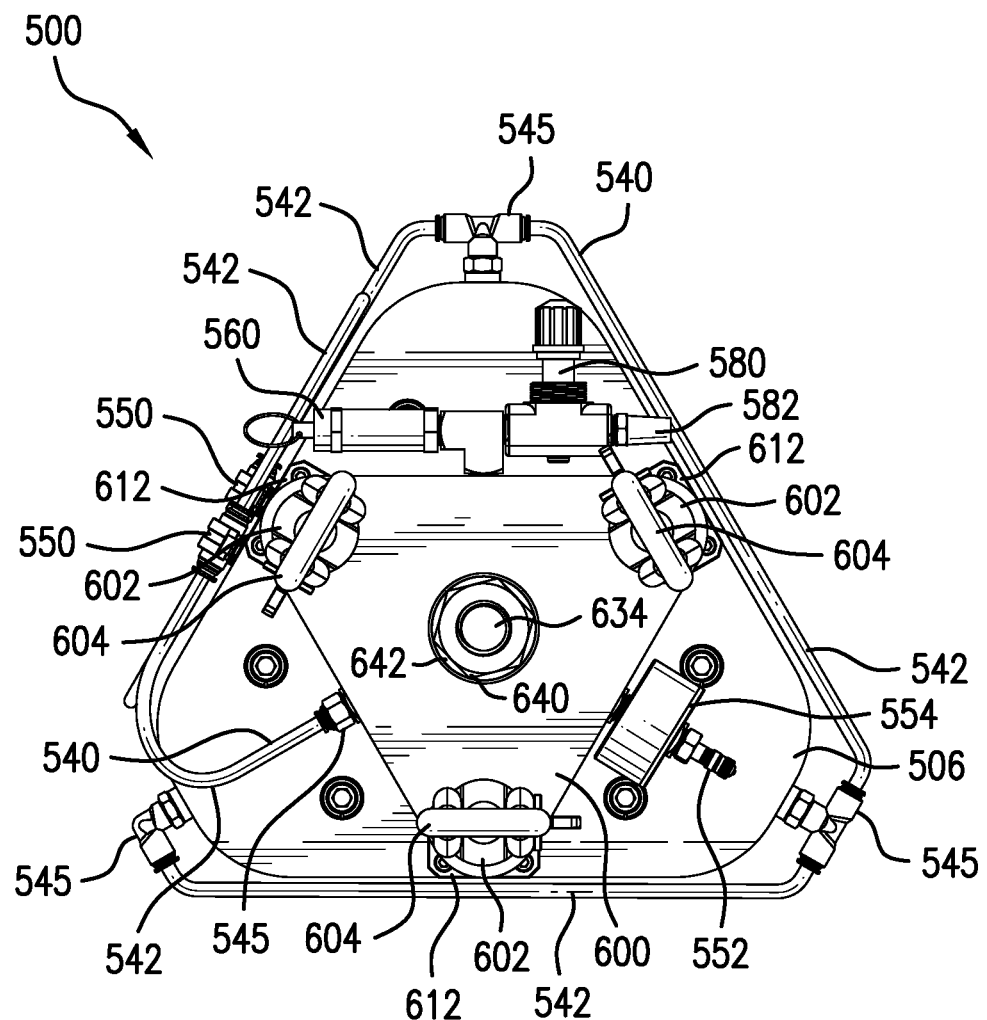
FIG. 21 is a top plan view of the pneumatically adjustable lifting apparatus of FIG. 18.

Referring to FIG. 21, pneumatically adjustable lifting apparatus 500 further comprises relief valve 560 that provides the same function as relief valve 230 of pneumatically adjustable lifting apparatus 200. If inflatable spring devices 520 and 530 are compressed such that the internal pressure exceeds a predefined pressure, relief valve 560 automatically vents air from inflatable spring devices 520 and 530. Venting the air causes inflatable spring devices 520 and 530 to deflate until top plate 506 contacts bearing rod stop collars 570 and coupler plate 510 contacts bearing rod stop collars 572. Bearing rod stop collars 570 and 572 are described in the ensuing description. Pneumatically adjustable lifting apparatus 500 further comprises needle valve 580 and muffler fitting 582 which have the same configuration, function and purpose as needle valve 234 and muffler fitting 236, respectively, of pneumatically adjustable lifting apparatus 200.

Referring to FIGS. 18-21, pneumatically adjustable lifting apparatus 500 further comprises bearing rod spacer plate 600 which provides the same function as bearing rod spacer plate 240 of pneumatically adjustable lifting apparatus 200. Bearing rod spacer plate 600 has central opening 601. Central opening 601 has the same purpose as that of central opening 241 (see FIG. 8). A plurality of swivel hoist rings 602 are positioned on bearing rod spacer plate 600. Swivel hoist rings 602 have the same configuration and function as that of swivel hoist rings 242 of pneumatically adjustable lifting apparatus 200. Each swivel hoist ring 602 has a rating of about 1,000 lbs. Each swivel hoist ring 602 has shackle 604. Shackles 604 have the same configuration and purpose as shackles 244 of pneumatically adjustable lifting apparatus 200. Each swivel hoist ring 602 has a threaded shank (not shown) which has the same purpose as that of threaded shank 243 of pneumatically adjustable lifting apparatus 200. Each threaded shank of a swivel hoist ring 602 extends through a corresponding through-hole in bearing rod spacer plate 600. Pneumatically adjustable lifting apparatus 500 includes linear bearing rods 610 that are attached to bearing rod spacer plate 600. Specifically, the top end portion of each linear bearing rod 610 has a threaded bore that is threadedly engaged with a corresponding threaded shank of a swivel hoist ring 602 in the same manner in which each linear bearing rod 250 is attached to a threaded shank 243 (see FIG. 11). Each linear bearing rod 610 extends through a corresponding linear ball bearing assembly 612 that is attached to top plate 506 and positioned within a corresponding opening in top plate 506. Each linear ball bearing assembly 612 includes a flanged bearing housing that has a length that is greater than the thickness of top plate 506. Each linear ball bearing assembly 612 provides a smooth, low friction linear guide for a corresponding linear bearing rod 610. This configuration allows top plate 506 to smoothly move or slide upon linear bearing rods 610 either in an upward direction or downward direction. Each linear bearing rod 610 extends through corresponding through-holes in top plate 506 and coupler plate 508 and through a corresponding bearing rod stop collar 570 and through a corresponding through-hole in coupler plate 510 and through a corresponding bearing rod stop collar 572. The bottom end portion of each linear bearing rod 610 is attached to bottom plate 512 in the same manner in which linear bearing rod 250 is attached to bottom plate 204 of pneumatically adjustable lifting apparatus 200. Specifically, the bottom end portion of each linear bearing rod 610 has a threaded bore and corresponding screws or bolts (not shown) are inserted through corresponding openings or through-holes in bottom plate 512 and threadedly engaged with the threaded bores of the bottom end portions of each linear bearing rod 610. Each bearing rod stop collar 570 and 572 is free-floating and functions as a "stop device" that prevents over-compression of inflatable spring devices 520 and 530. Hence, if a heavy load causes inflatable air springs 520 and 530 to experience a high degree of compression, bearing rod stop collars 570 limit the downward movement of top plate 506 and bearing rod stop collars 572 limit the downward movement of intermediate plate structure 507.

Figure 20:
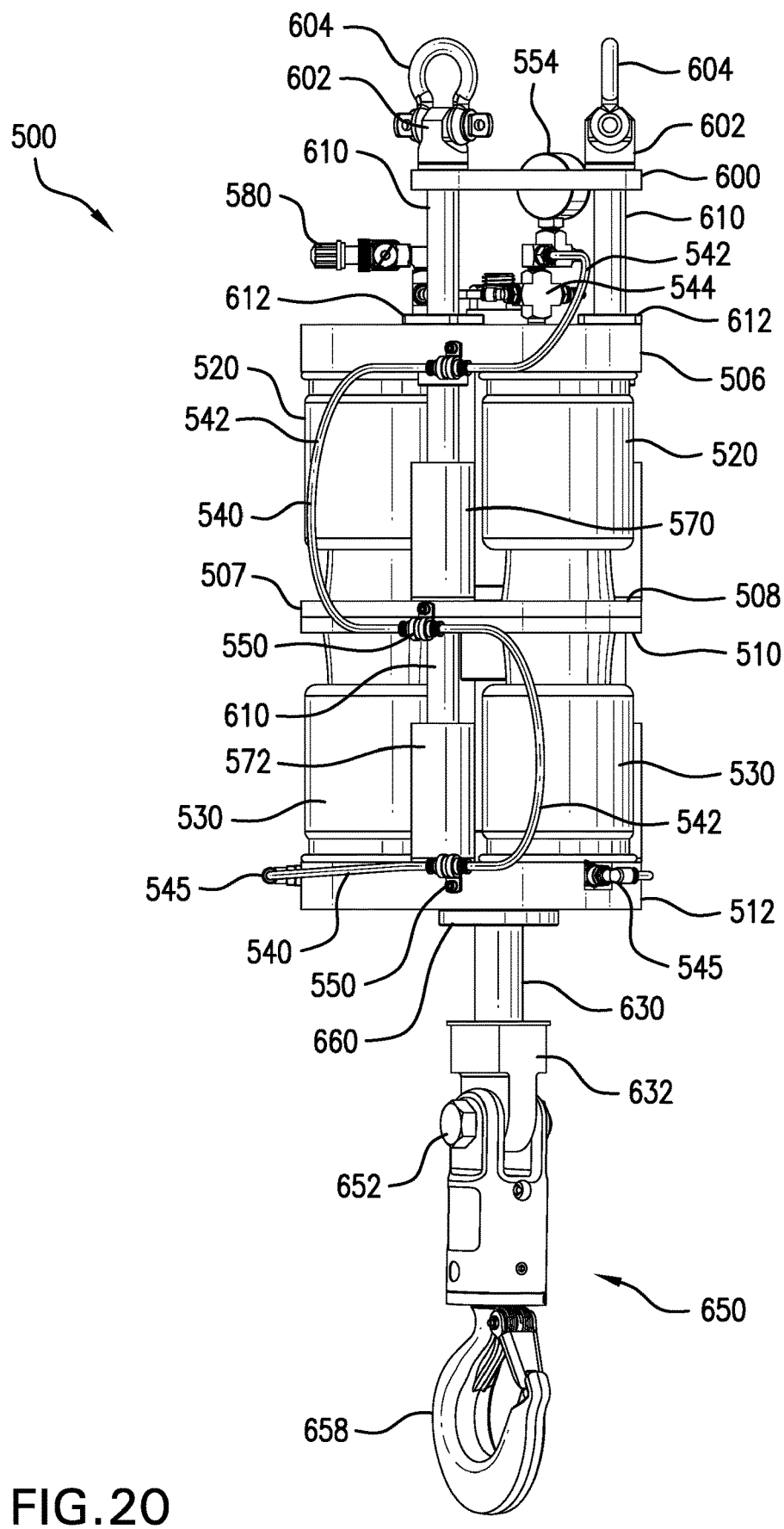
FIG. 20 is left side elevational view of the pneumatically adjustable lifting apparatus of FIG. 18.

Referring to FIGS. 18-20, pneumatically adjustable lifting apparatus 500 further comprises hollow bearing shaft 630. Hollow bearing shaft 630 generally performs the same function as hollow bearing shaft 270 of pneumatically adjustable lifting device 200. However the length of hollow bearing shaft 630 is significantly greater in length than hollow bearing shaft 270 as a result of there being two groups of inflatable spring devices 520 and 530. Hollow bearing shaft 630 extends through central openings (not shown) in bottom plate 512 and in coupler plates 508 and 510. Pneumatically adjustable lifting apparatus 500 further comprises a load attachment assembly that includes lower hoist attachment fitting 632 and swivel hook assembly 650, which are described in detail in the ensuing description. Lower hoist attachment fitting 632 has the same configuration and function as lower hoist attachment fitting 272 of pneumatically adjustable lifting apparatus 200. Lifting apparatus 500 further comprises threaded rod 634. Threaded rod 634 has the same function as threaded rod 280 (see FIG. 11) but is significantly greater in length than threaded rod 280 because pneumatically adjustable lifting apparatus 500 utilizes two groups of inflatable spring devices 520 and 530. Threaded rod 634 extends through corresponding central openings (not shown) in plates 506, 508, 510 and 512 and through hollow bearing shaft 630. Threaded rod 634 is attached or secured to plate 506 by nut 640 and washer 642 (see FIG. 21). An appropriate tool (not shown) may be inserted through central opening 601 in bearing rod spacer plate 600 in order to tighten nut 640. The bottom portion of threaded rod 634 is screwed into a threaded inlet or bore (not shown) in lower hoist attachment fitting 632. Hollow bearing shaft 630 has a length that allows the top end of hollow bearing shaft 630 to contact or abut the bottom side of top plate 506. In a preferred embodiment, the top end of hollow bearing shaft 630 is not attached or secured to top plate 506. The bottom end of hollow bearing shaft 630 abuts lower hoist attachment fitting 632 but is not attached to lower hoist attachment fitting 632. Pneumatically adjustable lifting apparatus 500 further comprises swivel hook assembly 650 that is pivotably attached to lower hoist attachment fitting 632 by bolt 652 and nut 654. In an exemplary embodiment, pin 656 extends through bolt 652 to prevent nut 654 from becoming disengaged from bolt 652. Swivel hook assembly 650 includes hook 658. Swivel hook assembly 650 is configured so that hook 658 can rotate 360 degrees. Swivel hook assembly 650 has the same function and purpose as swivel hook assembly 290 of pneumatically adjustable lifting apparatus 200.

Referring to FIGS. 19 and 20, pneumatically adjustable lifting apparatus 500 further comprises flanged mounted linear bearing assembly 660 which has the same configuration, function and purpose as linear bearing assembly 300 of pneumatically adjustable lifting apparatus 200. Hollow bearing shaft 630 passes through and is movably engaged with linear bearing assembly 660. Linear bearing assembly 660 guides hollow bearing shaft 630 so as to provide lower hoist attachment fitting 632 with a single degree-of-freedom motion. Linear bearing assembly 660 counteracts any side loading of lower hoist attachment fitting 632 while maintaining low friction. Linear bearing assembly 660 allows hollow bearing shaft 630 to move in an upward direction or in a downward direction with respect to plate 512. Linear bearing assembly 660 is attached to or joined to bottom plate 512 in the same manner in which linear bearing assembly 300 is joined to bottom plate 204 (see FIG. 8). Rubber washers or bumpers (not shown) may be interposed between linear bearing assembly 660 and lower hoist attachment fitting 632. Rubber washers or bumpers have been described in detail in the foregoing description. Pneumatically adjustable lifting apparatus 500 further comprises an additional flanged linear bearing assembly (not shown) that has the same configuration as flanged linear bearing assembly 660 and is located within the central openings (not shown) in coupler plates 508 and 510. Hollow bearing shaft 630 extends through and is movably engaged with this additional flanged linear bearing assembly located in coupler plates 508 and 510. This additional flanged linear bearing assembly allows hollow bearing shaft 630 to smoothly move with respect to coupler plates 508 and 510 in an upward direction or downward direction. The additional flanged linear bearing assembly is attached to or joined to coupler plates 508 and 510 in the same manner that flanged linear bearing assembly 660 is attached or joined to bottom plate 512.

During use of pneumatically adjustable lifting apparatus 500, bridles (not shown) are attached to a crane and shackles 604 and a load is secured to hook 658 via a cable (not shown). As a result of the load, threaded rod 634 moves downward. Since threaded rod 634 is secured to top plate 506, top plate 506 also moves downward. As top plate 506 moves downward, it compresses inflatable spring devices 520. The downward compressive force on inflatable spring devices 520 also causes compression of inflatable spring devices 530. Top plate 506 will continue moving downward until it contacts bearing rod stop collars 570. Similarly, intermediate plate structure 507 continues to move downward and will stop when it contacts bearing rod stop collars 572. As a result of inflatable spring devices 520 being positioned above inflatable spring devices 530 and the lengths of linear bearing rods 610 and threaded rod 634, the distance corresponding to the downward linear travel of swivel hook assembly 650 is greater than the distance corresponding to the downward linear travel of swivel hook assembly 290 of pneumatically adjustable lifting apparatus 200.

Any suitable materials may be used to fabricate the components of the foregoing embodiments of the pneumatically adjustable lifting apparatus. For example, components such as plates, threaded rods, linear bearing rods, swivel hoists, shackles, bearing spacer plates, hooks, lower hoist attachment fittings, hollow bearing shafts and swivel hook assemblies may be fabricated from steel or carbon steel, stainless steel, titanium, iron, copper, brass or other suitable metals.

The pneumatically adjustable lifting apparatus disclosed herein provides lightly damped vertical travel with a substantially linear force profile over a relatively wide displacement range. Linear recirculating ball bearings cooperate with the linear loading characteristics of the inflatable spring devices to minimize the vertical motion damping of the pneumatically adjustable lifting apparatus. The inflatable spring devices (e.g. inflatable spring device 16) allow soft mating between components that need to be connected together, such as assembling or disassembling large threaded connections. The pneumatically adjustable lifting apparatus maintains a neutral load on the mating threads while allowing for an improved window of travel not available with conventional precision placement devices. As a result of such operational characteristics, riggers and crane operators can maintain substantially neutral thread loading with timed incremental movements by the crane while the rigger rotates the mating threaded components. Pneumatic pressure in the inflatable spring devices is adjusted prior to the thread mating operation and remains constant throughout operation. Other than the rigging slings attached to the upper shackles (e.g. shackle 44) and cables attached to the load attachment assembly (e.g. swivel hook 92), there are no other external connections to the pneumatically adjustable lifting apparatus.

The foregoing description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. In this regard, while the disclosed subject matter has been described in connection with various embodiments and corresponding Figures, where applicable, it is to be understood that other similar embodiments can be used or modifications and additions can be made to the described embodiments for performing the same, similar, alternative or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A pneumatically adjustable lifting apparatus comprising:
    a plurality of vertically oriented linear bearing rods, each linear bearing rod having a top end and a bottom end;
    a top plate movably attached to the linear bearing rods such that the top plate is movable in an upward direction and in a downward direction with respect to the linear bearing rods, wherein the top end of each linear bearing rod is above the top plate;
    a bottom plate spaced apart from the top plate and attached to the bottom end of each linear bearing rod, the bottom plate having a generally centered opening;
    a plurality of inflatable spring devices interposed between and attached to the top plate and bottom plate, each inflatable spring device being inflated with a gas at a predefined pressure;
    a bearing rod spacer plate attached to the top ends of the linear bearing rods so that the bearing rod spacer plate is positioned above and spaced apart from the top plate;
    at least one upper hoist assembly attached to the bearing rod spacer plate and configured to be attached to external lifting machinery;
    a vertically oriented hollow bearing shaft extending through the generally centered opening in the bottom plate such that the hollow bearing shaft is movable with respect to the bottom plate in an upward direction and in a downward direction, the hollow bearing shaft having an open top end that is positioned above the bottom plate and an open bottom end that is below the bottom plate;
    a vertically oriented elongate rod extending through the hollow bearing shaft and having a top portion secured to the top plate such that downward movement of the elongate rod pulls the top plate downward, the elongate rod having a bottom portion that extends from the open bottom end of the hollow bearing shaft; and
    a load attachment assembly attached to the bottom portion of the elongate rod and configured to be attached to a load, whereby when a load is suspended from the load attachment assembly, the weight of the load produces forces that pull the elongate rod downward thereby causing the top plate to move downward and compress the inflatable spring devices and when such forces decrease, the inflatable spring devices expand thereby pushing the top plate upward.

2. The pneumatically adjustable lifting apparatus according to claim 1 further comprising a pneumatic network in gaseous communication with the inflatable spring devices so as to provide pressurized gas to the inflatable spring devices.

3. The pneumatically adjustable lifting apparatus according to claim 2 wherein the pneumatic network includes at least one pressure gauge to measure the pressure of the gas within the pneumatic network.

4. The pneumatically adjustable lifting apparatus according to claim 2 wherein the pneumatic network further comprises:
    at least one input valve for injecting pressurized gas into the pneumatic network; and
    at least one relief valve to vent pressurized gas from the pneumatic network.

5. The pneumatically adjustable lifting apparatus according to claim 1 further comprising a plurality of vertically oriented hollow bearing rod stop collars interposed between the top plate and bottom plate to limit the downward movement of the top plate, wherein each bearing rod stop collar is seated upon the bottom plate and each linear bearing rod extends through a corresponding bearing rod stop collar.

6. The pneumatically adjustable lifting apparatus according to claim 1 wherein the at least one upper hoist assembly comprises a plurality of equidistantly spaced upper hoist assemblies.

7. The pneumatically adjustable lifting apparatus according to claim 6 wherein the bearing rod spacer plate includes a plurality of openings therein and wherein the each upper hoist assembly has a shank that extends through one of the openings in the bearing rod spacer plate and is attached to a top end portion of a corresponding linear bearing rod.

8. The pneumatically adjustable lifting apparatus according to claim 1 wherein the vertically oriented elongate rod comprises a threaded top end portion and wherein the top plate has a central opening through which the threaded top end portion extends, the pneumatically adjustable lifting apparatus further comprising means, engaged with the threaded top end portion, to secure the elongate rod to the top plate.

9. The pneumatically adjustable lifting apparatus according to claim 1 wherein the load attachment assembly comprises:
    a hoist attachment member attached to the bottom portion of the elongate rod; and
    a lower hoist assembly movably attached to the hoist attachment member and configured to be attached to the load.

10. The pneumatically adjustable lifting apparatus according to claim 9 wherein the lower hoist assembly comprises a swivel hook assembly.

11. The pneumatically adjustable lifting apparatus according to claim 9 wherein the lower hoist assembly comprises a shackle.

12. The pneumatically adjustable lifting apparatus according to claim 1 further comprising a plurality of bearing assemblies, wherein each bearing assembly is attached to the top plate and each linear bearing rod is engaged with a corresponding bearing assembly.

13. The pneumatically adjustable lifting apparatus according to claim 1 further comprising a bearing assembly attached to the bottom plate and positioned within the generally centered opening, wherein the vertically oriented hollow bearing shaft is movably engaged with the bearing assembly.

14. A pneumatically adjustable lifting apparatus comprising:
- a plurality of vertically oriented linear bearing rods, each linear bearing rod having a top end and an opposite bottom end;
- a top plate having a plurality of bearing assemblies, wherein each linear bearing rod is engaged with a corresponding bearing assembly such that the top plate is movably attached to the linear bearing rods and is movable in an upward direction and in a downward direction with respect to the linear bearing rods, wherein the top rod of each linear bearing rod is above the top plate;
- a bottom plate attached to the bottom ends of the linear bearing rods and spaced apart from the top plate, the bottom plate having an opening therein and a bearing assembly positioned within the opening and attached to the bottom plate;
- a plurality of inflatable spring devices interposed between and attached to the top plate and bottom plate, each inflatable spring device being inflated with a gas at a predefined pressure;
- a pneumatic network in gaseous communication with the inflatable spring devices to provide pressurized gas to the inflatable spring devices;
- a plurality of vertically oriented hollow bearing rod stop collars interposed between the top plate and bottom plate to limit the downward travel of the top plate, wherein each hollow bearing rod stop collar sits upon the bottom plate and a corresponding linear bearing rod extends through the bearing rod stop collar;
- a bearing rod spacer plate attached to the top ends of the linear bearing rods so that the bearing rod spacer plate is positioned above and spaced apart from the top plate;
- at least one upper hoist assembly attached to the bearing rod spacer plate, the at least one upper hoist assembly being configured to be attached to external lifting machinery;
- a vertically oriented hollow bearing shaft extending through and engaged with the bearing assembly attached to the bottom plate such that the vertically oriented hollow bearing shaft is movable in an upward direction and in a downward direction with respect to the bottom plate, the vertically oriented hollow bearing shaft having an open top end that is positioned above the bottom plate and an open bottom end that is below the bottom plate;
- a vertically oriented elongate rod extending through the vertically oriented hollow bearing shaft and having a top portion secured to the top plate so that downward movement of the elongate rod causes downward movement of the top plate, the elongate rod having a bottom portion that extends from the open bottom end of the hollow bearing shaft;
- a hoist attachment member attached to the bottom portion of the vertically oriented elongate rod;
- a lower hoist assembly movably attached to the hoist attachment member and configured to be attached to a load; and
- whereby when a load is suspended from the lower hoist assembly, the weight of the load produces forces that pull the elongate rod downward thereby causing the top plate to move downward and compress the inflatable spring devices and when such forces decrease, the inflatable spring devices expand thereby pushing the top plate upward.

15. A pneumatically adjustable lifting apparatus comprising:
- a plurality of vertically oriented linear bearing rods, each linear bearing rod having a top end portion and a bottom end portion;
- a top plate movably attached to the linear bearing rods such that the top plate is movable in an upward direction and in a downward direction with respect to the linear bearing rods, wherein the top end portion of each linear bearing rod is above the top plate;
- an intermediate plate structure movably attached to the linear bearing rods such that the intermediate plate structure is movable in an upward direction and in a downward direction with respect to the linear bearing rods, the intermediate plate structure being spaced apart from the top plate and having a generally centered opening;
- a first plurality of inflatable spring devices interposed between and attached to the top plate and the intermediate plate structure, each inflatable spring device being inflated with a gas;
- a bottom plate attached to the end of each linear bearing rod, the bottom plate being spaced apart from the intermediate plate structure and having a generally centered opening that is aligned with the generally centered opening of the intermediate plate structure;
- a second plurality of inflatable spring devices interposed between and attached to the intermediate plate structure and the bottom plate, each inflatable spring device of the second plurality of inflatable spring devices being inflated with a gas;
- a pneumatic network in gaseous communication with and providing pressurized gas to the first plurality of inflatable spring devices and the second plurality of inflatable spring devices;
- a bearing rod spacer plate attached to the top end portion of each vertically oriented linear bearing rod such that the bearing rod spacer plate is positioned above and spaced apart from the top plate;
- at least one upper hoist assembly attached to the bearing rod spacer plate, the at least one upper hoist assembly being configured to be attached to external lifting machinery;
- a vertically oriented hollow bearing shaft extending through the generally centered opening of bottom plate and generally centered opening of the intermediate plate structure such that the hollow bearing shaft is movable with respect to the bottom plate and intermediate plate structure in an upward direction and in a downward direction, the hollow bearing shaft having an open bottom end that is below the bottom plate;
- a vertically oriented elongate rod extending through the hollow bearing shaft and having a top portion secured to the top plate and a bottom portion that extends from the open bottom end of the hollow bearing shaft; and
- a load attachment assembly attached to the bottom portion of the elongate rod and configured to be attached to a load, whereby when a load is suspended from the load attachment assembly, the weight of the load produces forces that pull the elongate rod downward thereby causing (i) the top plate to move downward and compress the first plurality of inflatable spring devices and (ii) the intermediate plate structure to move downward and compress the second plurality of inflatable spring devices and when said forces decrease, the first plurality of inflatable spring devices expand thereby pushing the top plate upward and the second plurality of inflatable spring devices expand thereby pushing the intermediate plate structure upward.

16. The pneumatically adjustable lifting apparatus according to claim 15 further comprising a plurality of vertically oriented hollow bearing rod stop collars interposed between the top plate and the intermediate plate structure for limiting the downward travel of the top plate, wherein each bearing rod stop collar is seated upon the intermediate plate structure and wherein a corresponding one of the vertically oriented linear bearing rod extends through the bearing rod stop collar.

17. The pneumatically adjustable lifting apparatus according to claim 15 further comprising a plurality of vertically oriented hollow bearing rod stop collars interposed between the intermediate plate structure and the bottom plate for limiting the downward travel of the immediate plate structure, wherein each bearing rod stop collar is seated upon the bottom plate and wherein a corresponding one of the vertically oriented linear bearing rod extends through the bearing rod stop collar.

18. The pneumatically adjustable lifting apparatus according to claim 15 further comprising a pneumatic network in gaseous communication with the first plurality of inflatable spring devices and second plurality of inflatable spring devices so as to provide pressurized gas to all the inflatable spring devices.

19. The pneumatically adjustable lifting apparatus according to claim 15 wherein:
- the top plate has a plurality of bearing assemblies attached thereto and each bearing assembly is engaged with a corresponding linear bearing rod; and
- the bottom plate has a bearing assembly positioned within the generally centered opening and engaged with the vertically oriented hollow bearing shaft.

20. The pneumatically adjustable lifting apparatus according to claim 15 wherein the intermediate plate structure comprises a first coupler plate and a second coupler plate attached to and positioned under the first coupler plate, wherein the first plurality of inflatable spring devices is attached to the top plate and the first coupler plate and the second plurality of inflatable spring devices is attached to the second coupler plate and the bottom plate.

* * * * *